United States Patent
Mason et al.

(10) Patent No.: US 8,422,487 B2
(45) Date of Patent: Apr. 16, 2013

(54) PRESENCE REGISTRATION AND ROUTING NODE

(75) Inventors: John R. Mason, Clayton, NC (US);
Peter Joseph Marsico, Carrboro, NC (US)

(73) Assignee: Tekelec, Inc., Morrisville, NC (US)

( * ) Notice: Subject to any disclaimer, the term of this patent is extended or adjusted under 35 U.S.C. 154(b) by 0 days.

(21) Appl. No.: 12/762,908

(22) Filed: Apr. 19, 2010

(65) Prior Publication Data

US 2010/0205248 A1 Aug. 12, 2010

Related U.S. Application Data

(62) Division of application No. 09/627,253, filed on Jul. 28, 2000, now Pat. No. 7,701, 925.

(60) Provisional application No. 60/191,278, filed on Mar. 22, 2000.

(51) Int. Cl.
*H04L 12/66* (2006.01)

(52) U.S. Cl.
USPC ............ 370/352; 370/252; 370/410; 370/467

(58) Field of Classification Search .................. 370/335, 370/352, 356, 466, 467, 242; 709/207
See application file for complete search history.

(56) References Cited

U.S. PATENT DOCUMENTS

| | | |
|---|---|---|
| 5,341,608 A | 8/1994 | Mains, Jr. |
| 5,475,651 A | 12/1995 | Bishop et al. |
| 5,579,371 A | 11/1996 | Aridas et al. |
| 5,610,969 A | 3/1997 | McHenry et al. |
| 5,774,668 A | 6/1998 | Choquier et al. |
| 5,812,639 A | 9/1998 | Bartholomew et al. |
| 5,999,525 A | 12/1999 | Krishnaswamy et al. |
| 6,091,957 A | 7/2000 | Larkins et al. |
| 6,091,959 A | 7/2000 | Souissi et al. |
| 6,094,573 A | 7/2000 | Heinonen et al. |
| 6,115,754 A | 9/2000 | Landgren |
| 6,119,014 A | 9/2000 | Alperovich et al. |
| 6,122,510 A | 9/2000 | Granberg |
| 6,125,177 A * | 9/2000 | Whittaker ..................... 379/243 |
| 6,128,304 A | 10/2000 | Gardell et al. |

(Continued)

FOREIGN PATENT DOCUMENTS

| | | |
|---|---|---|
| EP | 1 511 267 A1 | 3/2005 |
| EP | 1 269 764 B1 | 7/2008 |

(Continued)

OTHER PUBLICATIONS

Notice of Allowance for U.S. Appl. No. 11/077,711 (Feb. 16, 2011).

(Continued)

*Primary Examiner* — Hassan Kizou
*Assistant Examiner* — Toan Nguyen
(74) *Attorney, Agent, or Firm* — Jenkins, Wilson, Taylor & Hunt, P.A.

(57) ABSTRACT

A presence registration and routing node receives a message indicative of a telephony-related action performed by a user. In response to the message, the presence registration and routing node sends a message to a presence server for updating presence information regarding the user in a presence server database.

9 Claims, 17 Drawing Sheets

U.S. PATENT DOCUMENTS

| | | | |
|---|---|---|---|
| 6,134,314 A | 10/2000 | Dougherty et al. | |
| 6,134,432 A | 10/2000 | Holmes et al. | |
| 6,181,937 B1 | 1/2001 | Joensuu | |
| 6,215,790 B1 | 4/2001 | Voit et al. | |
| 6,219,551 B1 | 4/2001 | Hentila et al. | |
| 6,252,952 B1 | 6/2001 | Kung et al. | |
| 6,301,609 B1 * | 10/2001 | Aravamudan et al. | 709/207 |
| 6,304,565 B1 | 10/2001 | Ramamurthy | |
| 6,324,183 B1 | 11/2001 | Miller et al. | |
| 6,333,931 B1 | 12/2001 | LaPier et al. | |
| 6,363,411 B1 | 3/2002 | Dugan et al. | |
| 6,373,930 B1 | 4/2002 | McConnell et al. | |
| 6,424,647 B1 * | 7/2002 | Ng et al. | 370/352 |
| 6,430,176 B1 | 8/2002 | Christie, IV | |
| 6,446,127 B1 | 9/2002 | Schuster et al. | |
| 6,453,034 B1 | 9/2002 | Donovan et al. | |
| 6,456,845 B1 | 9/2002 | Drum et al. | |
| 6,470,179 B1 | 10/2002 | Chow et al. | |
| 6,515,997 B1 | 2/2003 | Feltner et al. | |
| 6,564,261 B1 | 5/2003 | Gudjonsson et al. | |
| 6,571,094 B1 | 5/2003 | Begeja et al. | |
| 6,611,516 B1 | 8/2003 | Pirkola et al. | |
| 6,639,981 B1 | 10/2003 | Dunn, Jr. et al. | |
| 6,704,287 B1 * | 3/2004 | Moharram | 370/242 |
| 6,718,178 B1 | 4/2004 | Sladek et al. | |
| 6,747,970 B1 | 6/2004 | Lamb et al. | |
| 6,760,343 B1 | 7/2004 | Krishnamurthy et al. | |
| 6,968,052 B2 | 11/2005 | Wullert, II | |
| 7,039,040 B1 * | 5/2006 | Burg | 370/352 |
| 7,058,036 B1 * | 6/2006 | Yu et al. | 370/335 |
| 7,146,181 B2 | 12/2006 | Schaedler et al. | |
| 7,209,968 B1 | 4/2007 | Secer | |
| 7,260,207 B2 | 8/2007 | Marsico | |
| 7,701,925 B1 | 4/2010 | Mason et al. | |
| 7,751,825 B2 | 7/2010 | Gogic | |
| 7,907,713 B2 | 3/2011 | Khadri | |
| 7,924,787 B2 | 4/2011 | Lee | |
| 7,933,608 B2 | 4/2011 | Tejani et al. | |
| 8,019,335 B2 | 9/2011 | Kallio | |
| 8,204,052 B2 | 6/2012 | Baldwin et al. | |
| 2001/0024950 A1 | 9/2001 | Hakala et al. | |
| 2001/0031641 A1 | 10/2001 | Ung et al. | |
| 2001/0034224 A1 | 10/2001 | McDowell et al. | |
| 2001/0034237 A1 | 10/2001 | Garahi | |
| 2002/0058507 A1 | 5/2002 | Valentine et al. | |
| 2002/0061746 A1 | 5/2002 | Jo et al. | |
| 2002/0078209 A1 | 6/2002 | Peng | |
| 2002/0086672 A1 | 7/2002 | McDowell et al. | |
| 2002/0187781 A1 | 12/2002 | Furlong | |
| 2002/0193127 A1 | 12/2002 | Martschitsch | |
| 2003/0026289 A1 | 2/2003 | Mukherjee et al. | |
| 2003/0031160 A1 | 2/2003 | Gibson Ang et al. | |
| 2003/0065788 A1 | 4/2003 | Salomaki | |
| 2003/0073074 A1 | 4/2003 | Mukherjee et al. | |
| 2003/0100326 A1 | 5/2003 | Grube et al. | |
| 2003/0148779 A1 | 8/2003 | Aravamudan et al. | |
| 2003/0177281 A1 | 9/2003 | McQuillan et al. | |
| 2003/0235180 A1 | 12/2003 | Oprescu-Surcobe et al. | |
| 2004/0003037 A1 | 1/2004 | Fujimoto et al. | |
| 2004/0015569 A1 | 1/2004 | Lonnfors et al. | |
| 2004/0047303 A1 | 3/2004 | Fernandez et al. | |
| 2004/0062383 A1 | 4/2004 | Sylvain | |
| 2004/0125790 A1 | 7/2004 | Hiller et al. | |
| 2004/0133641 A1 | 7/2004 | McKinnon et al. | |
| 2004/0153506 A1 | 8/2004 | Ito et al. | |
| 2004/0193686 A1 | 9/2004 | Blagsvedt et al. | |
| 2004/0203923 A1 | 10/2004 | Mullen | |
| 2005/0027867 A1 | 2/2005 | Mueller et al. | |
| 2005/0050157 A1 | 3/2005 | Day | |
| 2005/0070310 A1 | 3/2005 | Caspi et al. | |
| 2005/0074101 A1 | 4/2005 | Moore et al. | |
| 2005/0091387 A1 | 4/2005 | Abe | |
| 2005/0136952 A1 | 6/2005 | Zabawskyj et al. | |
| 2005/0143111 A1 | 6/2005 | Fitzpatrick et al. | |
| 2005/0143135 A1 | 6/2005 | Brems et al. | |
| 2005/0164682 A1 | 7/2005 | Jenkins et al. | |
| 2005/0202836 A1 | 9/2005 | Schaedler et al. | |
| 2005/0228895 A1 | 10/2005 | Karunamurthy et al. | |
| 2005/0266859 A1 | 12/2005 | Tejani et al. | |
| 2006/0068762 A1 | 3/2006 | Baldwin | |
| 2006/0112177 A1 | 5/2006 | Barkley et al. | |
| 2006/0140189 A1 | 6/2006 | Wu et al. | |
| 2006/0244638 A1 | 11/2006 | Lettau | |
| 2006/0246880 A1 | 11/2006 | Baldwin et al. | |
| 2007/0127676 A1 | 6/2007 | Khadri | |
| 2007/0282911 A1 | 12/2007 | Bantukul et al. | |
| 2008/0137832 A1 | 6/2008 | Heinze et al. | |
| 2009/0069047 A1 | 3/2009 | Russell et al. | |
| 2009/0089322 A1 | 4/2009 | Naaman | |
| 2009/0233629 A1 | 9/2009 | Jayanthi | |
| 2010/0017472 A1 | 1/2010 | Benedyk et al. | |
| 2010/0137002 A1 | 6/2010 | Agarwal et al. | |

FOREIGN PATENT DOCUMENTS

| | | |
|---|---|---|
| JP | 2005057709 | 3/2005 |
| WO | WO 99/14910 | 3/1999 |
| WO | WO 00/35155 A1 | 6/2000 |
| WO | WO 01/45342 A2 | 6/2001 |
| WO | WO 01/56308 A2 | 8/2001 |
| WO | WO 01/72055 A2 | 9/2001 |
| WO | WO 03/032616 A1 | 4/2003 |
| WO | WO 2005/086966 A2 | 9/2005 |
| WO | WO 2005/086972 A2 | 9/2005 |
| WO | WO 2006/118755 A2 | 11/2006 |
| WO | WO 2007/050591 A2 | 5/2007 |
| WO | WO 2008/036645 A2 | 3/2008 |

OTHER PUBLICATIONS

Interview Summary for U.S. Appl. No. 11/077,711 (Dec. 21, 2010).
Notice of Allowance and Fee(s) Due for U.S. Appl. No. 11/077,711 (Dec. 20, 2010).
Interview Summary for U.S. Appl. No. 11/077,711 (Dec. 3, 2010).
Notice of Allowance and Fee(s) Due for U.S. Appl. No. 11/586,423 (Oct. 6, 2010).
European Search Report for European application No. 06826548.7 (Sep. 3, 2010).
Final Official Action for U.S. Appl. No. 11/077,711 (Jun. 23, 2010).
Final Official Action for U.S. Appl. No. 11/120,324 (Jun. 22, 2010).
Communication purusant to Article 94(3) EPC for European application No. 08153801.9 (May 28, 2010).
Interview Summary for U.S. Appl. No. 11/120,324 (Mar. 11, 2010).
Interview Summary for U.S. Appl. No. 11/077,711 (Mar. 4, 2010).
European Search Report for European application No. 08153801.9 (Jan. 27, 2010).
Notification of Transmittal of the International Search Report and the Written Opinion of the International Searching Authority, or the Declaration of PCT/US2009/047391 (Jan. 25, 2010).
Official Action for U.S. Appl. No. 11/586,423 (Jan. 6, 2010).
Official Action for U.S. Appl. No. 11/077,711 (Dec. 24, 2009).
Commonly-assigned, co-pending U.S. Appl. No. 12/624,974 for "Methods, Systems, and Computer Readable Media for Providing Geo-Location Proximity Updates to a Presence System," (Unpublished, filed Nov. 24, 2009).
Official Action for U.S. Appl. No. 11/120,324 (Oct. 19, 2009).
Interview Summary for U.S. Appl. No. 11/586,423 (Oct. 15, 2009).
Notice of Allowance and Fee(s) Due for U.S. Appl. No. 09/627,253 (Jul. 24, 2009).
*Ex parte Quayle* for U.S. Appl. No. 09/627,253 (May 7, 2009).
Communication regarding the expiry of the time limit within which notice of opposition may be filed for European Application No. 01920654.9 dated May 7, 2009.
Official Action for U.S. Appl. No. 11/586,423 (Apr. 29, 2009).
Final Official Action for U.S. Appl. No. 11/077,711 (Mar. 16, 2009).
Official Action for U.S. Appl. No. 11/120,324 (Jan. 21, 2009).
Notice of Abandonment for U.S. Appl. No. 09/627,253 (Nov. 12, 2008).
Office Action for U.S. Appl. No. 11/586,423 (Jul. 25, 2008).
Office Action for U.S. Appl. No. 11/077,711 (Jun. 26, 2008).
Notification of Transmittal of the International Search Report and the Written Opinion of the International Searching Authority, or the Declaration for International Application No. PCT/US06/41451 (Jul. 7, 2008).

Office Action for U.S. Appl. No. 11/120,324 (Apr. 16, 2008).
Final Official Action for U.S. Appl. No. 09/627,253 (Apr. 4, 2008).
Notification of Transmittal of the International Search Report and the Written Opinion of the International Searching Authority, or the Declaration for International Application No. PCT/US06/13404 (Oct. 5, 2007).
Official Action for U.S. Appl. No. 09/627,253 (Sep. 20, 2007).
Restriction/Election Requirement for U.S. Appl. No. 09/627,253 (Jun. 14, 2007).
Communication pursuant to Article 96(2) EPC corresponding to European application No. 01 920 654.9 dated May 2, 2007.
Notice of Panel Decision for U.S. Appl. No. 09/627,253 (Apr. 2, 2007).
Notice of Allowance and Fee(s) Due for U.S. Appl. No. 10/798,924 (Oct. 3, 2006).
Official Action for U.S. Appl. No. 09/627,253 (Aug. 25, 2006).
Notification of Transmittal of the International Search Report and the Written Opinion of the International Searching Authority, or the Declaration for International Application No. PCT/US05/08258 (Aug. 16, 2006).
Notification of Transmittal of the International Search Report and the Written Opinion of the International Searching Authority, or the Declaration for International Application No. PCT/US05/08307 (Mar. 13, 2006).
Official Action for U.S. Appl. No. 10/798,924 (Feb. 23, 2006).
Advisory Action for U.S. Appl. No. 09/627,253 (Dec. 28, 2005).
Final Official Action for U.S. Appl. No. 09/627,253 (Jun. 2, 2005).
Notification of Transmittal of the International Search Report and the Written Opinion of the International Searching Authority, or Declaration for International Application No. PCT/US05/08307 (Mar. 11, 2005).
Klyne, et al., "Common Presence and Instant Messaging (CPIM): Message," Network Working Group, RFC 3862, p. 1-23 (Aug. 2004).
Peterson, J., "Common Profile for Instant Messaging (CPIM)," Network Working Group, RFC 3860 (Aug. 2004).
Official Action for U.S. Appl. No. 09/627,253 (May 19, 2004).
Restriction/Election Requirement for U.S. Appl. No. 09/627,253 (Jan. 9, 2004).
Campbell et al., "SIP Instant Message Sessions," p. 1 (Jun. 30, 2003).
Official Action for U.S. Appl. No. 09/627,253 (Apr. 28, 2003).
Interview Summary for U.S. Appl. No. 09/627,253 (Jan. 30, 2003).
Campbell et al., "Session Initiation Protocol (SIP) Extension for Instant Messaging," pp. 1-15 (Dec. 2002).
Rosenberg et al., "SIP: Session Initiation Protocol," Network Working Group, FRC 3261 (Jun. 2002).
"3$^{rd}$ Generation Partnership Project; Technical Specification Group Services and Systems Aspects; Network Architecture (Release 5)," 3GPP TS 23.002, V5.7.0, p. 1-50, (Jun. 2002).
Sugano et al., "Presence Information Data Format for IMPP," Internet draft, draft-ieff-impp-pidf-01.text, Network Working Froup, p. 1-17, (Mar. 10, 2000).

Aggarwal et al., "Transport Protocol for Presence Information/Instant Messaging," Internet draft, draft-ietf-impp-pitp-mitp-01, Network Working Group, p. 1-21, (Mar. 9, 2000).
Day et al., "A Model for Presence and Instant Messaging," Request for Comments: 2778, Network Working Group, p. 1-17, (Feb. 2000).
Day et al., "Instant Messaging/Presence Protocol Requirements," Request for Comments: 2779, Network Working Group, p. 1-26, (Feb. 2000).
Stracke, J., "Message Information Data Format," Internet draft, draft-ietf-impp-midf-01.txt, Network Working Group, p. 1-4, (Jan. 19, 2000).
Tekelec, "IP7 Secure Gateway Release 1.0", Tekelec Release Documentation, 910-2046-01 Revision A (Nov. 1999).
Handley et al., "SIP: Session Initiation Protocol," Request for Comments: 2543, Network Working Group, p. 1-111, (Mar. 1999).
Saraswat et al., "The Presence Protocol," Internet-Draft, draft-saraswat-presenceprotocol-00.txt, p. 1-15 (Feb. 26, 1999).
Rosenberg et al., "SIP for Presence," IETF, draft-rosenberg-sip-pip-00.txt, p. 1-22 (Nov. 13, 1998).
Handley et al., "SDP: Session Description Protocol," Request for Comments: 2327, Network Working Group, p. 1-42, (Apr. 1998).
Tekelec, "Feature Guide Eagle STP," P/N 910-1225-01 Revision B (Jan. 1998).
Tekelec, "Feature Guide LNP LSMS," P/N. 910-1598-01 Revision A (Jan. 1998).
Interview Summary for U.S. Appl. No. 11/120,324 (Mar. 1, 2011).
Official Action for U.S. Appl. No. 11/120,324 (Mar. 1, 2011).
Chinese Offical Action for Chinese Patent Application No. 200680049126.1 (Feb. 24, 2011).
Second Office Action of Chinese Patent Application No. 200680049126.1 (Dec. 6, 2011).
Non-Final Official Action for U.S. Appl. No. 11/120,324 (Nov. 1, 2011).
Extended European Search Report for European Application No. 09763799.5 (Oct. 14, 2011).
Supplementary European Search Report for European application No. 05725442.7 (Aug. 16, 2011).
Non-Final Official Action for U.S. Appl. No. 12/484,857 (Aug. 30, 2012).
Notice of Granting Patent Right for Invention for Chinese Patent Application No. 200680049126.1 (Aug. 6, 2012).
Non-Final Official Action for U.S. Appl. No. 12/624,974 (Aug. 3, 2012).
Communication under Rule 71(3) EPC for European Application No. 08 153 801.9 (Apr. 23, 2012).
Notice of Allowance and Fee(s) Due for U.S. Appl. No. 11/120,324 (Feb. 22, 2012).
Noting of loss of rights pursuant to Rule 112(1) EPC for European Application No. 09763799.5 (Feb. 7, 2012).

* cited by examiner

USAGE & MEASUREMENTS DATABASE — 930

| Keys | | Data Fields | | | | | | |
|---|---|---|---|---|---|---|---|---|
| Transaction ID | Time | Service Provider | Service Recipient | Service Type | CgPA | CdPA | PC/IP Add. | Originating SSN/Port |
| 1025 | 23:12.23 | 12 | 34 | 01 | 9194605500 | jsmith@aol.com | 2-1-1 | 50 |
| 1534 | 23:34.01 | 23 | 13 | 01 | pjm@tk.com | 9194605500 | 102.20.20.10 | 23 |
| 1632 | 23:36.59 | 12 | 15 | 03 | tek.com | Retailer.com | 103.30.30.10 | 24 |

Figure 15

PRESENCE REGISTRATION AND ROUTING NODE

PRIORITY CLAIM

This application is a divisional patent application of U.S. patent application Ser. No. 09/627,253, filed Jul. 28, 2000, now U.S. Pat. No. 7,701,925, which claims the benefit of U.S. Provisional Patent Application No. 60/191,278, filed Mar. 22, 2000, the disclosure of each of which is incorporated herein by reference in its entirety.

TECHNICAL FIELD

The present invention relates to presence database services, and more particularly to the routing and processing of presence service related signaling messages in a communications network.

BACKGROUND ART

Instant messaging (IM), as it is currently known within the communications industry, is an Internet technology that allows subscribers to send and receive text messages, voice messages and other data in near real-time. While IM started as a way to chat with friends, the technology has become an essential tool for many businesses, as it offers the convenience of e-mail and the immediacy of a phone call, as well as file transfers and voice messaging.

Instant messaging is possible because the people sending and receiving messages remain constantly connected to their IM service. Recipients get messages as fast as the data can travel across the Internet. Conventional e-mail, on the other hand, is less immediate. E-mail technology sends messages to a server that stores the items until they are downloaded by the recipient's e-mail software. Many industry experts argue that it is the "instant" or near real-time communication characteristic that has made and will continue to make IM a mode of communication in the future.

At present, when a subscriber logs in to an IM service, the subscriber's software notifies a presence server or similar client based presence system that the subscriber is available to receive messages. Such a scenario is generally illustrated in FIG. 1. Once the subscriber is logged in or "registered," the subscriber can choose to send a message to another online user. From a network communication perspective, such a communication is accomplished via the sending of data packets containing address and user-type information to the intended recipient. Depending on which service is used, a server either directly relays the message to the recipient or facilitates a direct connection between the sender of a message and the recipient. In FIG. 1, communication between IM clients 100 is facilitated by presence server 102. In order to communicate with other instant message clients, subscribers send registration messages to presence server 102. The registration messages may contain contact information for IM clients 102. A proposed presence protocol for performing registration and subscription services will be discussed in more detail below.

IM services typically employ one of three means to move messages around: a centralized network, a peer-to-peer connection, or a combination of both. In a centralized setup, users are connected to each other through a series of data servers. Such servers effectively form a wide area network (WAN). Consequently, when an instant message is sent by a subscriber, at least one of the data servers finds the intended recipient's PC address and routes the message through the network until it reaches its destination.

In the peer-to-peer approach, a central server maintains a database of online subscribers and their associated Internet Protocol addresses. After a subscriber logs in, such a server sends the subscriber the IP addresses of everyone on their contact list who is also currently logged on.

When a subscriber wishes to send an instant message to another user, the subscriber's client sends the IM directly to the user's client, without involving the server. As such, all IM message traffic does not necessarily go through the entire network. Such an architecture tends to result in improved network performance, as compared to other IM schemes.

An excellent discussion of a proposed presence protocol can be found in "The Presence Protocol," internet-draft-saraswat-presenceprotocol-00.txt, Feb. 26, 1999, the disclosure of which is incorporated herein by reference in its entirety. In the proposed presence protocol specification, a presence server is defined as a server that manages presence information for a collection of entities, subscriptions to those entities, and their privacy restrictions.

Each server has an address at which presence messages may be delivered. Presence information is defined in the proposed presence server protocol specification as information such as presence status, current point-of presence (if any), idle time, etc., for an entity. As used herein, the term presence information refers to any information regarding an end user or entity, including, but not limited to: end user location, end user status, media capabilities of a telephony gateway associated with the end user, end user directory number, end user IP address, etc.

An entity has control over publication of its presence information. An entity is defined as the unit, e.g. a person, on whose behalf presence information is being maintained. Each entity has a unique handle. The identity of the presence server maintaining presence information for the entity can be determined from the handle. A handle is well known name for an entity. An example of a handle is pp://www.intercom.att.com/TyrantRana. Finally, a point of presence (PoP) is defined as a point of presence for an entity. If an entity is present, it is connected to one PoP. Each PoP has an address, e.g., an IP address and a port number, at which presence messages may be delivered.

A typical example of how the presence protocol may be used is as follows. An entity A connected to an endpoint E may subscribed through a presence server P to another entity B. When the status of B changes, P will notify E of the change in status of B, if B's privacy specifications allow. If P is unable to notify E, for instance, because E is unreachable, P marks E as absent and will subsequently not attempt to deliver to E until E reestablishes its presence. In addition, P may periodically ping an endpoint for current status information on the entities connected through that endpoint. Such a heartbeat from the presence server ensures that presence information stored at the server is current.

Once presence information about an entity is delivered to an endpoint, the endpoint may directly contact the entity. Protocols for exchanging instant messages, file transfer, etc. between two such endpoints are not defined in the above-referenced presence protocol specification. Similarly, the protocol used for communication between clients and PoPs is outside the scope of the presence protocol specification. In addition, the transport protocol used to deliver presence messages including presence registration and update messages is not defined in the presence protocol specification.

One thing that the presence protocol specification does specify is message types used to perform presence-related actions. It is these message types that may be sent by a presence server to update and obtain presence information from a presence database. The message types include an assert message, which is sent by a PoP whenever the presence information associated with an entity changes. A fetch message is a request sent to the presence server to obtain presence information regarding a target specified in the fetch message. A subscribe message is a message sent to the presence server to allow the subscriber to receive presence information updates regarding a target specified in the subscribe message. A notify message is a message sent by the presence server to a requestor or a subscriber to convey presence information about a named entity.

There are currently models, including the models described above, that provide for instant messaging (IM) and presence services within the scope of an Internet Protocol/data network environment. It will be appreciated from the discussion above that one of the key elements of IM operation involves the ability for one subscriber to "know" when another subscriber is logged in or is "available." From the discussion above, it will also be appreciated that the ability to track the login status, otherwise known as "presence," of Internet users is fairly well developed and widely practiced. However, as communication networking technology has continued to evolve at a rapid pace, so have the means by which end users or subscribers can communicate. More particularly, the explosive growth of hand-held, wireless communication terminals, such as cell phones, wireless WEB phones, and personal digital assistants has led to a demand for inter-networking or inter-medium communication solutions. In other words, it is rapidly becoming useful for a subscriber to have their wireless phone status or "presence" known to other subscribers, where these other subscribers may be using a variety of communication mediums, such as wireless phone service, wired phone service, short message service (SMS), or Internet service.

At present, such data network-based presence models do not address the implementation of these services within a traditional Public Switched Telephone Network (PSTN) environment. Again, with the continuing movement towards the convergence of data and telephony networks, there exists the need to provide a system and method of enabling instant messaging and presence services in a communications environment that includes components of both traditional data and traditional telephony networks. Therefore, what is needed is an instant messaging/presence model for use in a converged data and telephony network.

DISCLOSURE OF THE INVENTION

According to one aspect, the present invention includes a presence registration and routing node. The presence registration and routing node receives a signaling system 7 (SS7) message in response to a telephony-related action, such as the activation of a mobile handset, the dialing of a directory number to establish a call, or the entry of predetermined DTMF digits. In response to the SS7 message, the presence registration and routing node formulates a presence-server-compatible message for updating presence information regarding an end user in a presence server database. The presence-server-compatible message may be in any presence-server-compatible format, including session initiation protocol (SIP), presence, and Instant messaging and presence protocol (IMPP). SIP is defined in RFC 2543, SIP: Session Initiation Protocol (March 1999), the disclosure of which is incorporated herein by reference in its entirety. IMPP is defined in RFC 2778, A Model for Instant Messaging, (February 2000) and in RFC 2779: Instant Messaging/Presence Protocol Requirements (February 2000), the disclosures of each of which are incorporated herein by reference in their entirety. Presence is defined in a variety of documents, including the IETF Internet draft mentioned above and other IETF documents that will be discussed below. The present invention is not intended to be limited to any specific presence protocol format. The formats discussed herein are examples of presence protocol formats suitable for use with the present invention.

According to another aspect, a presence registration and routing node includes an advanced database communications module (ADCM) for receiving queries for presence information. The ADCM module forwards the queries to a presence application, such as a SIP. IMPP, or presence application. The presence application formulates a presence-server-compatible message, forwards the presence-server-compatible message to a presence database, receives a response from the database, an forwards the response to the ADCM module to be sent to the requestor over an IP network. The presence database may be internal or external to the presence registration and routing node.

Some aspects of the invention will be explained in terms of modules and processes. It is understood that these modules or processes may be implemented in hardware, software, or a combination of hardware and software. Exemplary hardware upon which the processes and modules described below may execute includes a microprocessor, such as an Intel Pentium® processor and associated memory. Each of the modules in a presence registration and routing node according to the present invention may be a printed circuit board with a microprocessor and memory located thereon. The microprocessor may execute one or more computer programs for performing the presence registration and routing functions discussed below.

Accordingly, it is an object of the present invention to provide a presence registration and routing node for receiving SS7 messages in response to telephony-related actions and formulating presence-server-compatible messages in response to the SS7 messages.

It is another object of the present invention to provide a presence registration and routing node for receiving Internet Protocol (IP) encapsulated SS7 messages in response to telephony-related actions and formulating presence-server-compatible messages in response to the SS7 messages.

It is another object of the present invention to provide a presence registration and routing node capable of routing presence-server-compatible messages to a presence database and forwarding responses from the database over an IP network.

It is another object of the present invention to provide a presence registration and routing node that includes an internal or integrated presence database.

It is another object of the present invention to provide a presence registration and routing node that is adapted to maintain accounting or billing information related to presence database access.

BRIEF DESCRIPTION OF THE DRAWINGS

Preferred embodiments of the invention will now be explained with reference to the accompanying drawings of which:

FIG. 15 is a table that illustrates a sample usage and measurements database associated with a message accounting and billing subsystem of the present invention.

DETAILED DESCRIPTION OF THE INVENTION

Figure 1:
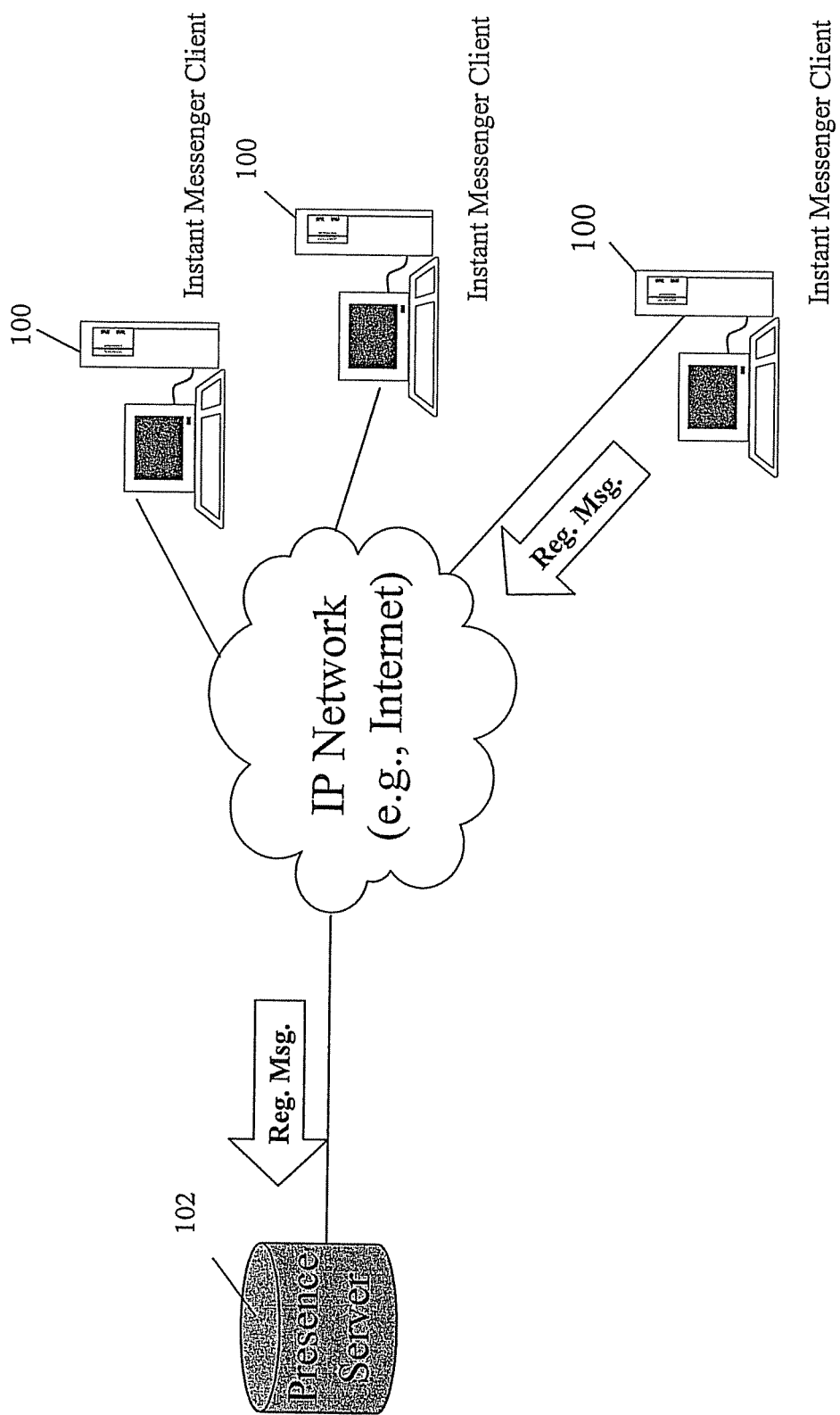
FIG. 1 is a block diagram illustrating conventional presence and instant messaging message flow.
Figure 2:
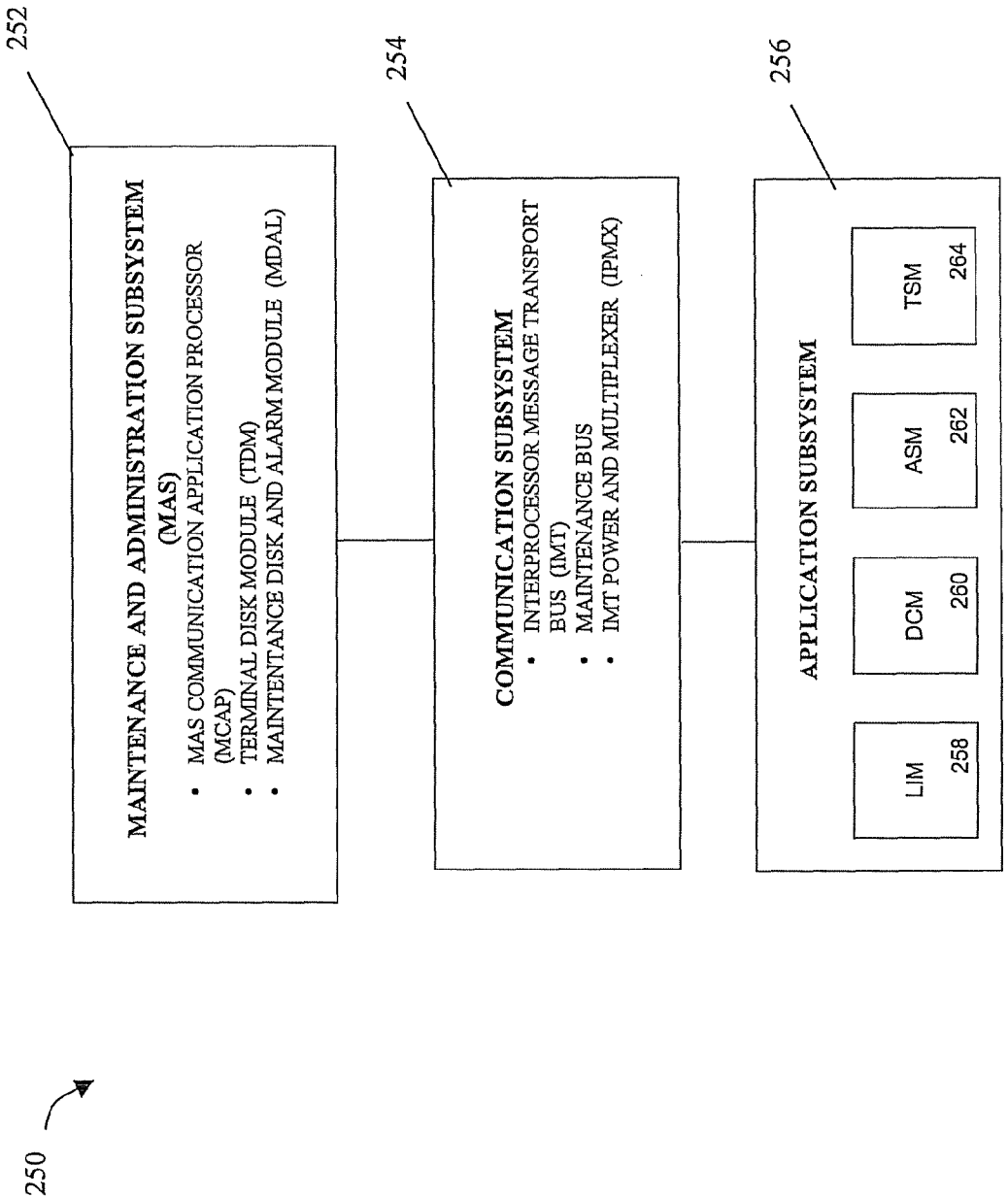
FIG. 2 is a block diagram of an SS7/IP gateway that may be modified to perform presence message processing according to embodiments of the present invention.

The present invention includes a presence registration and routing (PRR) node for communicating with and routing messages between both Internet Protocol (IP) and Signaling System 7 (SS7) network nodes. In one embodiment, a PRR node employs an internal architecture similar to that of high performance STP and signaling gateway (SG) products which are marketed by Tekelec, Inc., of Calabasas, Calif. as the Eagle® STP and IP$^7$ Secure Gateway™, respectively. A block diagram that generally illustrates the base internal architecture of the Eagle® STP product is shown in FIG. 2. A detailed description of the Eagle® STP may be found in the Eagle® Feature Guide PN/910-1225-01, Rev. B, January 1998, published by Tekelec, the disclosure of which is incorporated herein by reference in its entirety. Similarly, a detailed description of the IP$^7$ Secure Gateway™ may be found in Tekelec publication PN/909-0767-01, Rev B, August 1999, entitled *Feature Notice IP$^7$ Secure Gateway™ Release* 1.0, the disclosure of which is incorporated herein by reference in its entirety. The specific functional components of an IP$^7$ Secure Gateway™ for transmitting and receiving TCAP messages over an Internet Protocol (IP) network are described in commonly-assigned, co-pending International Patent Publication No. WO 00/35155, Published Jun. 15, 2000, the disclosure of which is incorporated herein by reference in its entirety. As described in the above referenced *Eagle® Feature Guide*, an Eagle® STP 250 includes the following subsystems: a Maintenance and Administration Subsystem (MAS) 252, a communication subsystem 254 and an application subsystem 256. The MAS 252 provides maintenance communications, initial program load, peripheral services, alarm processing and system disks. The communication subsystem 254 includes an Interprocessor Message Transport (IMT) bus that is the main communication bus among all subsystems in the Eagle® STP 250. This high-speed communications system functions as two 125 Mbps counter-rotating serial buses.

The application subsystem 256 includes application cards that are capable of communicating with the other cards through the IMT buses. Numerous types of application cards can be incorporated into STP 250, including: a Link Interface Module (LIM) 258 that provides SS7 links and X.25 links and an Application Service Module (ASM) 262 that provides global title translation, gateway screening and other services. A Translation Service Module (TSM) 264 may also be provided to support triggered local number portability service. Once again, a detailed description of the Eagle® STP is provided in the above cited *Eagle® Feature Guide* and need not be described in detail herein. With particular regard to the signaling gateway (SG) product line produced by Tekelec, it should also be appreciated that a Database Communication Module (DCM) 260 can be employed to provide for the transport of Internet Protocol (IP) encapsulated SS7 messages over an IP network, as described in the above referenced *Feature Notice IP$^7$ Secure Gateway™ Release* 1.0 publication. With further regard to the TSM triggered LNP services module mentioned above, a detailed description of the Tekelec triggered LNP solution may be found in the *Feature Guide LNP LSMS* PN/910-1598-01, Rev. A. January 1998, published by Tekelec, the disclosure of which is hereby incorporated herein by reference. Furthermore, systems and methods for providing triggerless LNP functionality within a network routing node are described in commonly-assigned, co-pending U.S. patent application Ser. No. 09/503,541, filed Feb. 14, 2000, the disclosure of which is incorporated herein by reference in its entirety.

SS7 MSU Triggered Presence Registration Message Generation

Figure 3:
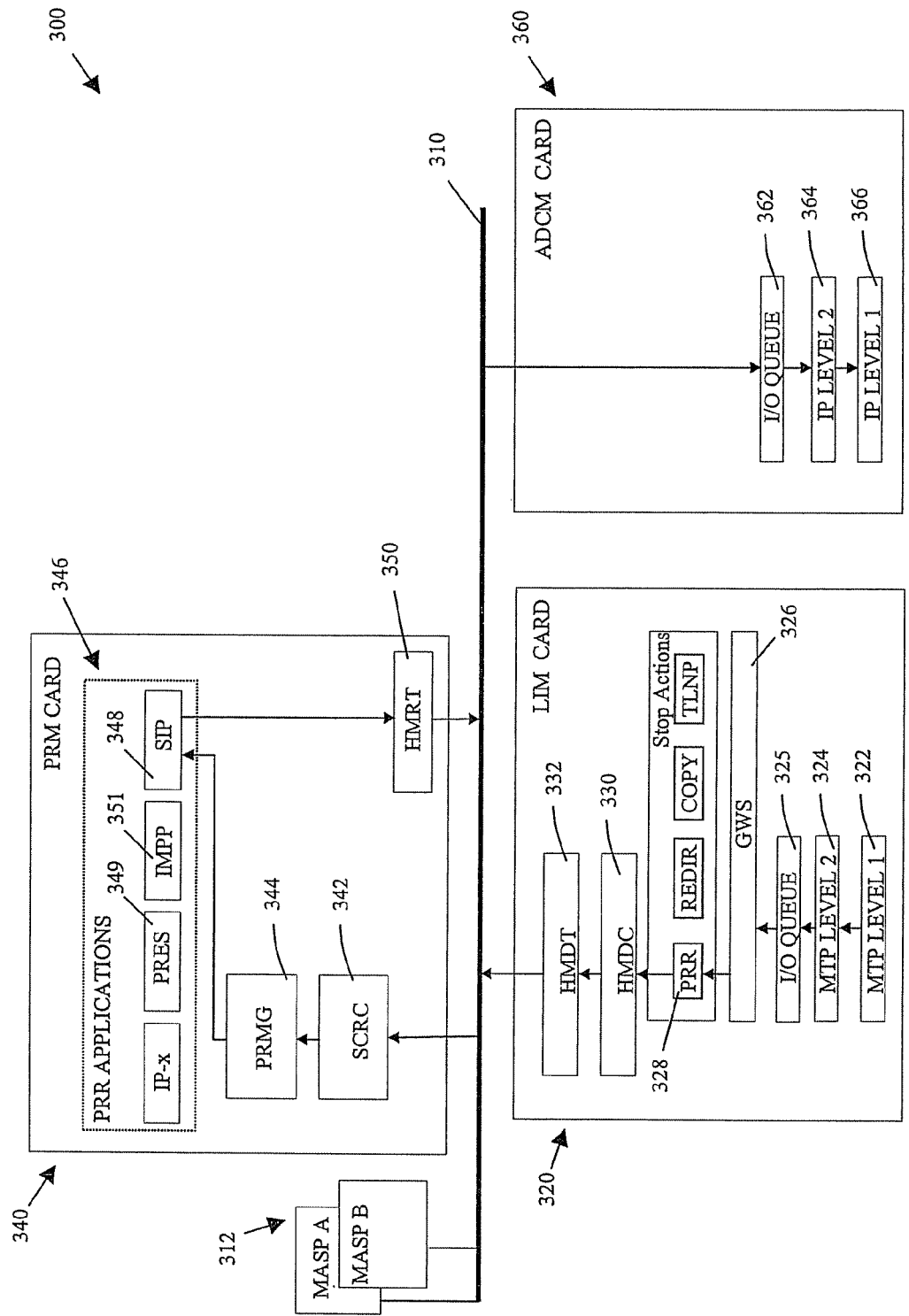
FIG. 3 is a block diagram of a presence registration and routing node according to an embodiment of the present invention.

Shown in FIG. 3 is a schematic diagram of a presence registration and routing node 300 of the present invention. It will be appreciated that presence registration and routing node 300 includes a high speed Interprocessor Message Transport (IMT) communications bus 310. Communicatively coupled to IMT bus 310 are a number of distributed processing modules or cards including; a pair of Maintenance and Administration Subsystem Processors (MASPs) 312, an SS7 capable Link Interface Module (LIM) 320, an IP capable Advanced Database Communication Module (ADCM) 360, and a Presence Registration Module (PRM) 340. These modules are physically connected to the IMT bus 310 such that signaling and other type messages may be routed internally between all active cards or modules. For simplicity of illustration, only a single LIM 320, ADCM 360, and PRM 340 are included in FIG. 3. However, it should be appreciated that the distributed, multi-processor architecture of the presence registration and routing node 300 facilitates the deployment of multiple LIM, ADCM, PRM, and other cards, all of which could be simultaneously connected to the IMT bus 310.

MASP pair 312 implements the maintenance and administration subsystem functions described above. As the MASP pair 312 are not particularly relevant to a discussion of the flexible routing attributes of the present invention, a detailed discussion of their function is not provided herein. For a comprehensive discussion of additional MASP operations and functionality, the above-referenced Tekelec publications can be consulted.

Focusing now on LIM card functionality, it will be appreciated that LIM 320 is comprised of a number of sub-component processes including, but not limited to; an SS7 MTP level 1 process 322, an SS7 MTP level 2 process 324, an I/O buffer or queue 325, a gateway screening (GWS) process 326, a Presence Registration Request (PRR) stop action process 328, an SS7 MTP level 3 layer HMDC process 330, and an HMDT process 332. MTP level 1 and 2 processes 322 and 324, respectively, provide the facilities necessary to send and receive digital data over a particular physical media/physical interface, as well as to provide error detection/correction and sequenced delivery of all SS7 message packets. I/O queue 325 provides for temporary buffering of incoming and outgoing signaling message packets. GWS process 326 is responsible for examining the incoming signaling message and determining which, if any, of the provisioned stop actions are applicable. PRR stop action process 328 is responsible for making a copy of, and subsequently encapsulating, an incoming SS7 ISDN User Part (ISUP) IAM signaling message packet within an SS7 Signaling Connection Control Part (SCCP) formatted packet. It should be appreciated that PRR stop action process 328 could also be configured to simply encapsulate the original incoming SS7 ISUP IAM signaling message, without making a copy. MTP level 3 HMDC process 330 receives signaling messages from the lower processing layers and performs a discrimination function, effectively determining whether an incoming SS7 message packet requires internal processing or is simply to be through switched. For instance, in the case of an SS7 TCAP message associated with presence registration or an SCCP encapsulated ISUP IAM message, HMDC process 330 would determine that the message should be internally routed for further processing. The HMDT process 332 manages or directs the internal routing of SS7 message packets that require additional processing prior to final routing. Once again, it should be appreciated that a LIM card may contain more functional processes than those described above. The above discussion is limited to LIM functionality associated with the basic processing of in-bound signaling messages.

As such, it will be appreciated that the three functional processes associated with an Advanced Database Communication Module (ADCM) 360 shown in FIG. 3 are simply those processes that are relevant to a discussion of out-bound ADCM operation in the examples of PS routing node operation disclosed herein. Furthermore, it will be appreciated that ADCM 360 is similar in function to the DCM application module described above. In the case of ADCM 360, the message packets processed by the card need not be native SS7 type messages that have been encapsulated in an IP packet. Instead, the ADCM 360 is capable of processing, transmitting, and receiving both native SS7 and native IP protocol messages.

The processes explicitly shown on the out-bound ADCM 360 include an I/O queue 362 and IP level 1 and 2 processes 366 and 364, respectively. I/O queue 362 facilitates temporary buffering of incoming and outgoing signaling message packets, while IP addressing operations are performed by the IP level 1 and 2 processes 366 and 364, respectively.

Once again, the description of LIM and ADCM sub-components provided in the above description is limited to those sub-components that are relevant to the sample implementation scenarios discussed herein. For a comprehensive discussion of additional LIM and ADCM-type operations and functionality, the above-referenced Tekelec publications can be consulted.

In general, a PRM card includes the database and database control processes necessary to achieve the presence registration message generation and routing functionality of the present invention. The PRM 340 shown in FIG. 3 is comprised, in part, of an SCCP subsystem controller known as a Signaling Connection Routing Controller (SCRC) process 342, a Presence Registration Manager (PRMG) process 344, and a number of Presence Registration Applications generally indicated by the numeral 346. Included among the Presence Registration Applications is a session initiation protocol (SIP) registration application process 348 for generating SIP messages, forwarding the SIP messages to a presence server, and processing SIP messages received from the presence server. The format for SIP messages is described in detail in the above-referenced RFC 2543, which defines the SIP protocol. In addition, the portion of a SIP message that carries the media capabilities information for an end user device is referred to as the session description protocol portion. The session description protocol is described in detail in RFC 2327, "SDP: Session Description Protocol," (April 1998), the disclosure of which is incorporated herein by reference in its entirety.

Presence protocol process 349 may also be included for communicating with a presence server using the messages described in the above-referenced presence protocol specification.

Instant messaging and presence protocol (IMPP) process 351 may also be included for communicating with a presence server according to the IMPP protocol. The IMPP protocol is described in detail above and in one or more of the following IETF Internet draft documents:

"Message Information Data Format," <draft-ietf-impp-midf-01.txt>, Jan. 19, 2000;

"Presence Information Data Format for IMPP." <draft-ieff-impp-pidf-01.b<t>, Mar. 10, 2000; and "Transport Protocol for Presence Information/Instant Messaging," <draft-ieff-impp-pitp-mitp-01>, Mar. 9, 2000, the disclosures of each of which are incorporated herein by reference in their entirety.

The present invention is not limited to communicating with a presence server using SIP. IMPP, or presence protocols. Any protocol for communicating with a presence server is within the scope of the invention.

The SCRC process 342 is responsible for discrimination of signaling messages at the SCCP level, and for distributing the signaling messages to an appropriate higher processing level application or function. In the configuration shown in FIG. 3, the next highest processing level is represented by the PRMG process 344. PRMG process 344 is responsible for determining how to process the incoming message packet. For instance, if the message packet contains an SCCP encapsulated ISUP IAM message, PRMG process 344 is configured to de-capsulate the original ISUP IAM message, and subsequently extract the appropriate information necessary for further processing from the de-capsulated message. However, if the incoming message were a TCAP formatted packet, no de-capsulation action would be required. In either case, PRMG process 344 is also charged with determining which of the provisioned presence registration applications is required for successful processing of a particular incoming signaling message packet. As will be appreciated from FIG. 3, a number of presence registration applications may be simultaneously provisioned on a single PRMG card. These presence registration applications may be configured such that each application is capable of generating presence registration messages that are formatted in different protocols including, but not limited to, SIP, IMPP, and presence protocol.

While any of the above-described presence registration applications may be provisioned on a single PRM card, SIP registration application 348 is used in the examples described herein to illustrate the functionality of the presence registration and routing node in updating presence information in a presence server database and obtaining presence information. SIP registration application 348 essentially contains the logic necessary to process the incoming SS7 message and construct the appropriate SIP-formatted presence registration message.

Figure 4:
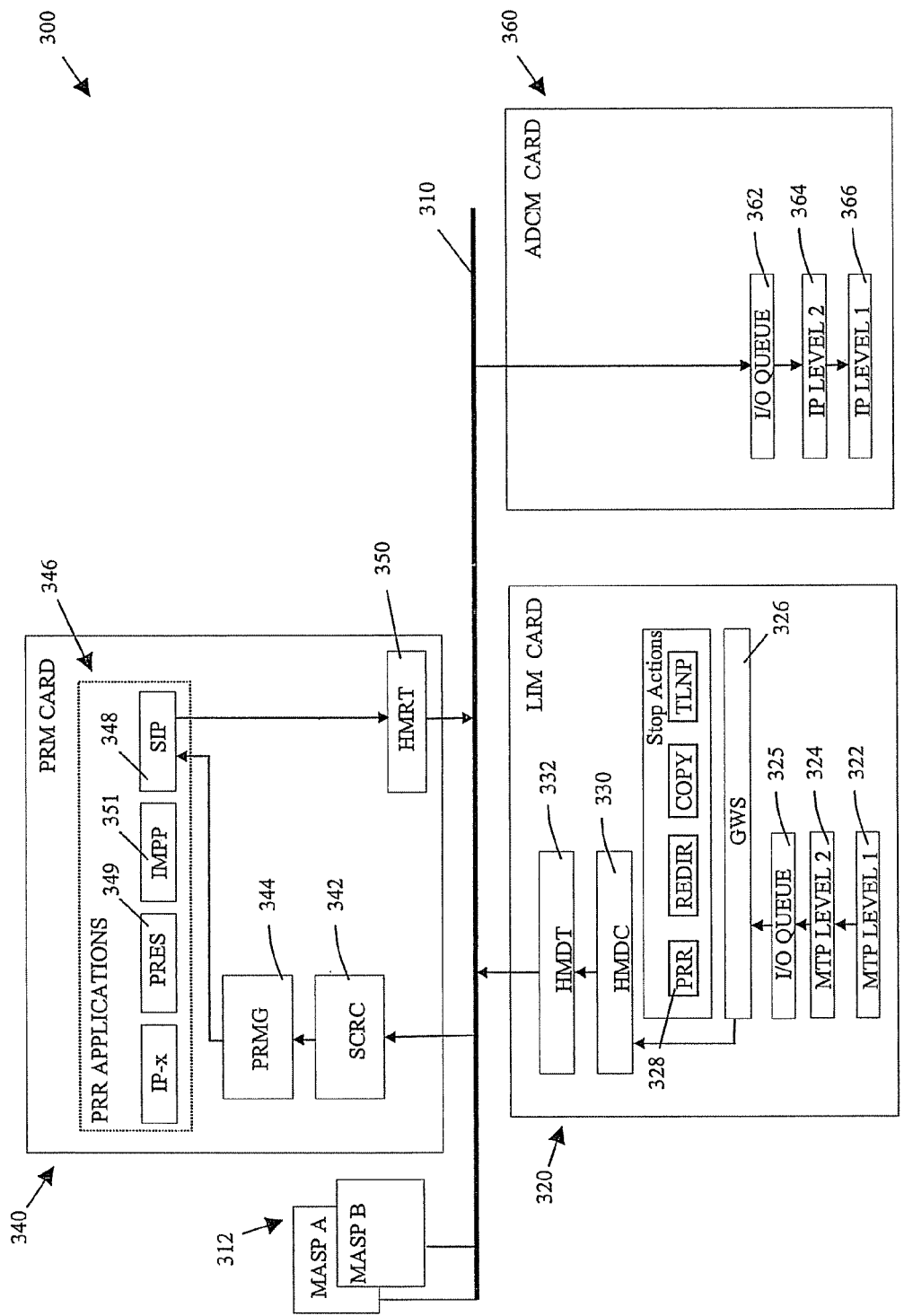
FIG. 4 is a block diagram of a presence registration and routing node according to an embodiment of the present invention.

Shown in FIGS. 3 and 4 are system level diagrams of one embodiment of presence registration and routing node 300 of the present invention. Also indicated in both figures are general message flows associated with the processing of incoming SS7 signaling packets and the generation of outbound presence registration messages. More particularly, FIG. 3 illustrates the message flow associated with an incoming SS7 ISUP IAM message, while FIG. 4 indicates the message flow associated with an incoming SS7 TCAP message. A detailed flow chart of the major steps associated with one particular implementation of the SS7 triggered presence registration message generation process is presented in FIGS. 5a and 5b, and may be used in conjunction with the schematic diagram shown in FIG. 3 to better understand the ISUP IAM based presence registration message generation methodology.

Figure 5A:
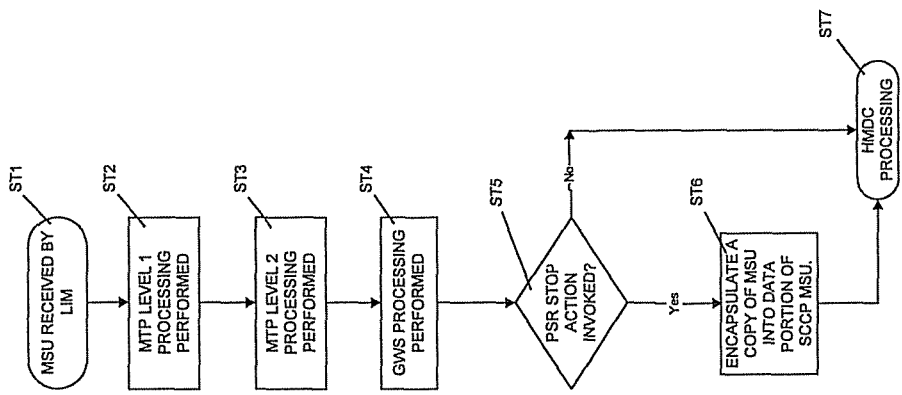
FIGS. 5a and 5b are a flow chart illustrating exemplary steps that may be performed by a presence registration and routing node in processing an IAM message according to an embodiment of the present invention.
Figure 6:
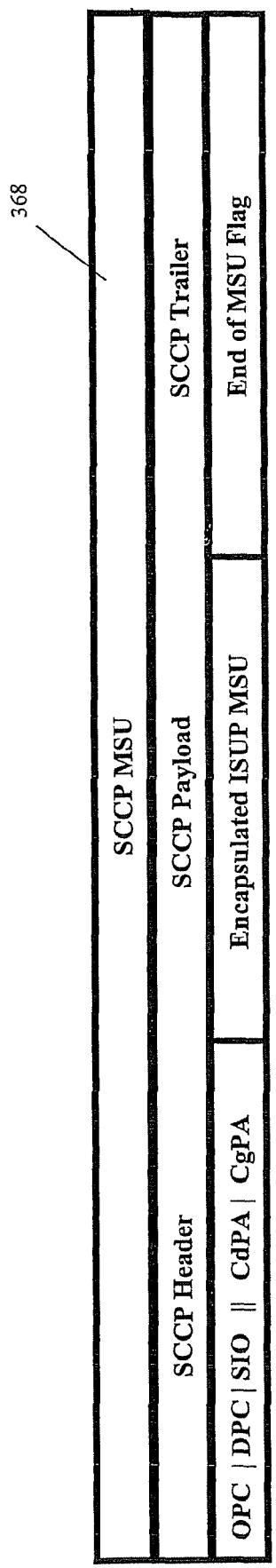
FIG. 6 is a block diagram illustrating SCCP encapsulation of an ISUP IAM message.

Referring to FIG. 5a, in step ST1, an incoming ISUP IAM message is received at the inbound LIM module 320. In steps ST2 and ST3, the incoming ISUP IAM message is received and processed by the MTP Level 1 and 2 processes 322 and 324, respectively. With MTP Level 1 and 2 processing complete, the signaling message packet is temporarily buffered in the I/O queue 325 before being passed up the stack to the MTP Level 3 Gateway Screening (GWS) process 326. As indicated in step ST4, GWS process 326 examines the incoming ISUP IAM message and determines not only whether the message is to be allowed into the switch for further processing, but also which, if any, of the provisioned stop actions are applicable to the incoming message. In this example, GWS process 326 examines the incoming ISUP IAM message and determines that the message is permitted to enter the switch. Furthermore, upon examination of the Originating Point Code (OPC), Destination Point Code (DPC) and Service Indicator Octet (SIO) fields contained in the MTP routing layer, it is determined that the message requires additional processing by the PRR stop action 328 (ST5). In steps ST6 PRR stop action process 328 receives the ISUP IAM message from GWS process 326 and determines that the incoming message is an ISUP type MSU. The PRR stop action process 328 next checks the DPC of the incoming MSU. More specifically, the PRR stop action verifies that the DPC of the incoming MSU is a valid PC. PRR stop action 328 examines the incoming MSU to determine whether presence registration service is required. If the incoming MSU is identified as being an ISUP IAM type message, PRR stop action 328 encapsulates a copy of the ISUP IAM message within an SCCP formatted MSU, as indicated in step ST6. Such SCCP encapsulation is effectively achieved by adding essential SCCP message leading and trailing bit sequences to the base bit sequence that comprises the ISUP IAM MSU, as generally illustrated in FIG. 6. Thus, an SCCP type encapsulated MSU is created which envelops or contains an ISUP type MSU. Subsequent to this encapsulation, the incoming message no longer appears or is treated as an ISUP IAM message within the presence registration and routing node 300, but is instead processed internally as an SCCP type SS7 message.

Unless additional processing by an unrelated subsystem is required, the original ISUP IAM MSU is then routed directly to HMDC process 330 where normal ISUP MSU type routing is resumed. However, once again, it should be appreciated that the original ISUP IAM MSU could be SCCP encapsulated and further processed instead of producing a copy of the ISUP MSU. It should also be appreciated that failure of the incoming ISUP MSU to meet the criteria specified in step causes the original, non-encapsulated MSU to be routed directly to HMDC process 330 where normal ISUP MSU type routing is resumed.

However, in the case where an incoming ISUP MSU satisfies the ST5 criteria, SCCP encapsulation of the ISUP MSU occurs and the resulting encapsulated MSU is directed to HMDC process 330 (ST7), where SCCP type processing is performed. In the example shown in FIG. 3, HMDC process 330 examines the message packet and determines that the DPC and Subsystem Number (SSN) of the SCCP packet is the PC of the presence registration and routing node. Consequently, further processing of the SCCP MSU within the routing node is assumed to be necessary, and the packet is passed to the HMDT process 332. The HMDT process 332 examines the Service Indicator (SI) field of the encapsulated MSU, which indicates that the encapsulating packet is of an SCCP type. As such, HMDT process 332 places the encapsulated SCCP MSU on high speed IMT bus 310 for transport to PRM 340 and subsequent presence registration service.

Figure 5B:
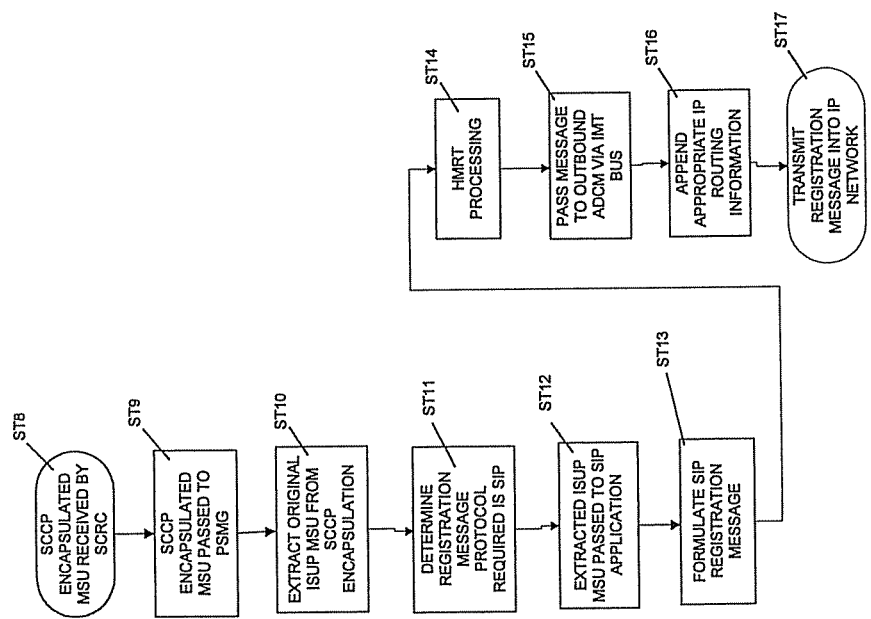

Referring to FIG. 5b, in step ST8, the encapsulated SCCP MSU is received and examined by SCRC process 342 that is resident on PRM 340. SCRC process 342 examines the message, determines that presence registration service is indicated, and forwards the encapsulated MSU to the PRMG process 344, as indicated by step ST9. In step ST10, PRMG process 344 extracts the ISUP IAM MSU from the SCCP envelope and determines that the ISUP MSU requires the generation of a SIP-formatted presence registration message (ST11). The ISUP IAM MSU is subsequently directed to SIP application 348 for further processing (ST12). SIP application 348 examines the ISUP IAM MSU and, using information contained within the MSU, generates a SIP-formatted presence registration message (ST13).

With SIP processing complete, the SIP-formatted presence registration message is passed to HMRT process 350. HMRT process 350 determines to which ADCM card the SIP registration message packet should be routed for subsequent outbound transmission (ST14). In this case, the HMRT process 350 determines that the desired outbound signaling link associated with the routing of the SIP registration message is located on ADCM 360. Consequently, the SIP message packet is internally routed across the IMT bus 310 to LIM 360, where it is generally received by the I/O queue process 362 (ST15). Eventually, the modified message packet is passed from the I/O queue 362 on to the IP Level 2 and Level 1 processes 364 and 366, respectively (ST16). Once again, IP level 1 and 2 processes 366 and 364, respectively, provide the facilities necessary to send and receive digital data over a particular physical media/physical interface, as well as to provide error detection/correction and sequenced delivery of all IP message packets transmitted into the IP network. As indicated in step ST17, the SIP-formatted presence registration message is then transmitted into an IP network for ultimate delivery to and use by a presence database system.

Figure 7:
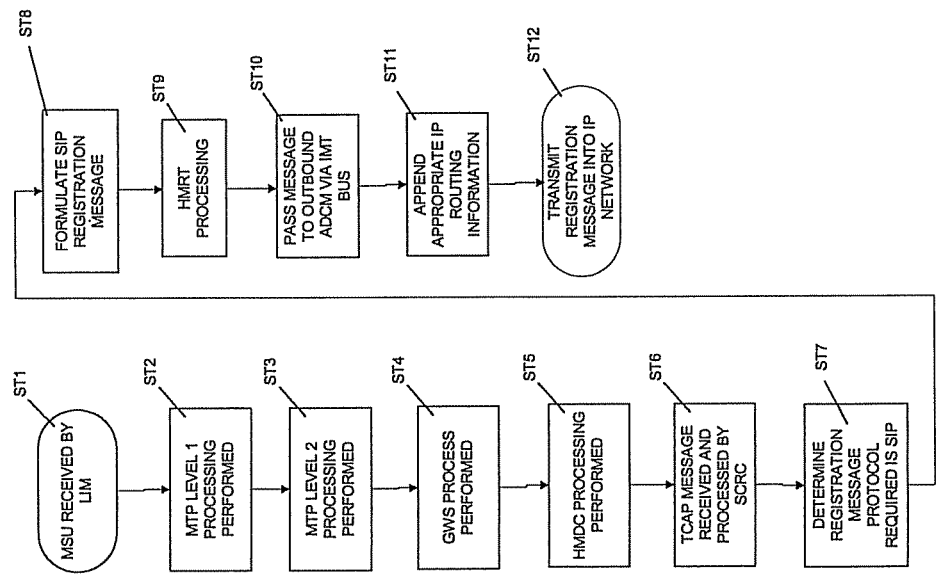
FIG. 7 is a flow chart illustrating exemplary steps that may be performed by a presence registration and routing node in processing a TCAP message according to an embodiment of the present invention.

It will be appreciated that the registration message generation methodology shown in FIG. 4 is fundamentally similar to the process indicated in FIGS. 5*a* and 5*b*. The primary difference involves processing variations that result from the handling of SS7 ISUP versus SS7 TCAP type messages. Most notably, since a TCAP message is, in fact, also an SCCP message, there is no need to directly encapsulate or copy and encapsulate the incoming TCAP message. Instead the TCAP message is simply directed from the inbound LIM 320 to the associated PRM 340 via the high speed IMT Bus 310, in much the same manner as the SCCP encapsulated ISUP IAM described in detail above. As such, FIG. 7 presents a flow chart of the major steps associated with the processing of a TCAP-type presence registration request message, which may be used in conjunction with the schematic diagram shown in FIG. 4 to better understand the TCAP based presence registration message generation methodology.

With particular regard to the scenario generally illustrated in FIG. 4, an incoming TCAP-formatted presence registration request message is received at the inbound LIM module 320 (ST1). Once again, in steps ST2 and ST3, the incoming TCAP message is received and processed by the MTP Level 1 and 2 processes 322 and 324, respectively. With MTP Level 1 and 2 processing complete, the signaling message packet is temporarily buffered in the I/O queue 325 before being passed up the stack to the MTP Level 3 Gateway Screening (GWS) process 326. As indicated in step ST4. GWS process 326 examines the incoming TCAP message and determines not only whether the message is to be allowed into the switch for further processing, but also which, if any, of the provisioned stop actions are applicable to the incoming message. In the scenario shown in FIG. 4, GWS process 326 examines the incoming TCAP message and determines that the message is permitted to enter the switch. Furthermore, upon examination of the Originating Point Code (OPC), Destination Point Code (DPC) and Service Indicator Octet (SIO) fields contained in the MTP routing layer, it is determined that the message does not require additional processing by the PRR stop action 328. As such, the TCAP MSU is then routed directly to HMDC process 330 where SCCP type processing is performed (ST5). In the example shown in FIG. 4, HMDC process 330 examines the message packet and determines that the DPC and Subsystem Number (SSN) of the TCAP packet is the PC of the presence registration and routing node. Consequently, further processing of the TCAP MSU within the routing node is assumed to be necessary, and the packet is passed to the HMDT process 332. The HMDT process 332 examines the Service Indicator (SI) field of the TCAP MSU, which indicates that the packet is of an SCCP type. As such, HMDT process 332 places the TCAP MSU on high speed IMT bus 310 for transport to PRM 340 and subsequent presence registration service.

In step ST6, the TCAP MSU is received and examined by SCRC process 342 that is resident on PRM 340. SCRC process 342 examines the message, determines that presence registration service is indicated, and forwards the TCAP MSU to the PRMG process 344. As indicated in step ST7, the content of the TCAP message is examined to determine whether the TCAP presence registration request requires the generation of a SIP-formatted message. In this example, it is assumed that the TCAP registration request message requires a SIP-formatted response and as such, is subsequently directed to SIP application 348 for further processing. SIP application 348 examines the TCAP MSU and, using information contained within the MSU, generates a SIP-formatted presence registration message (ST8).

With SIP processing complete, the SIP-formatted presence registration message is passed to HMRT process 350. HMRT process 350 determines to which ADCM card the SIP registration message packet should be routed for subsequent outbound transmission (ST9). In this case, the HMRT process 350 determines that the desired outbound signaling link associated with the routing of the SIP registration message is located on ADCM 360. Consequently, the SIP message packet is internally routed across the IMT bus 310 to LIM 360, where it is generally received by the I/O queue process 362 (ST10). Eventually, the modified message packet is passed from the I/O queue 362 on to the IP Level 2 and Level 1 processes 364 and 366, respectively (ST11). As indicated in step ST12, the SIP-formatted presence registration message is then transmitted into an IP network for ultimate delivery to and use by a presence database system.

Figure 8:
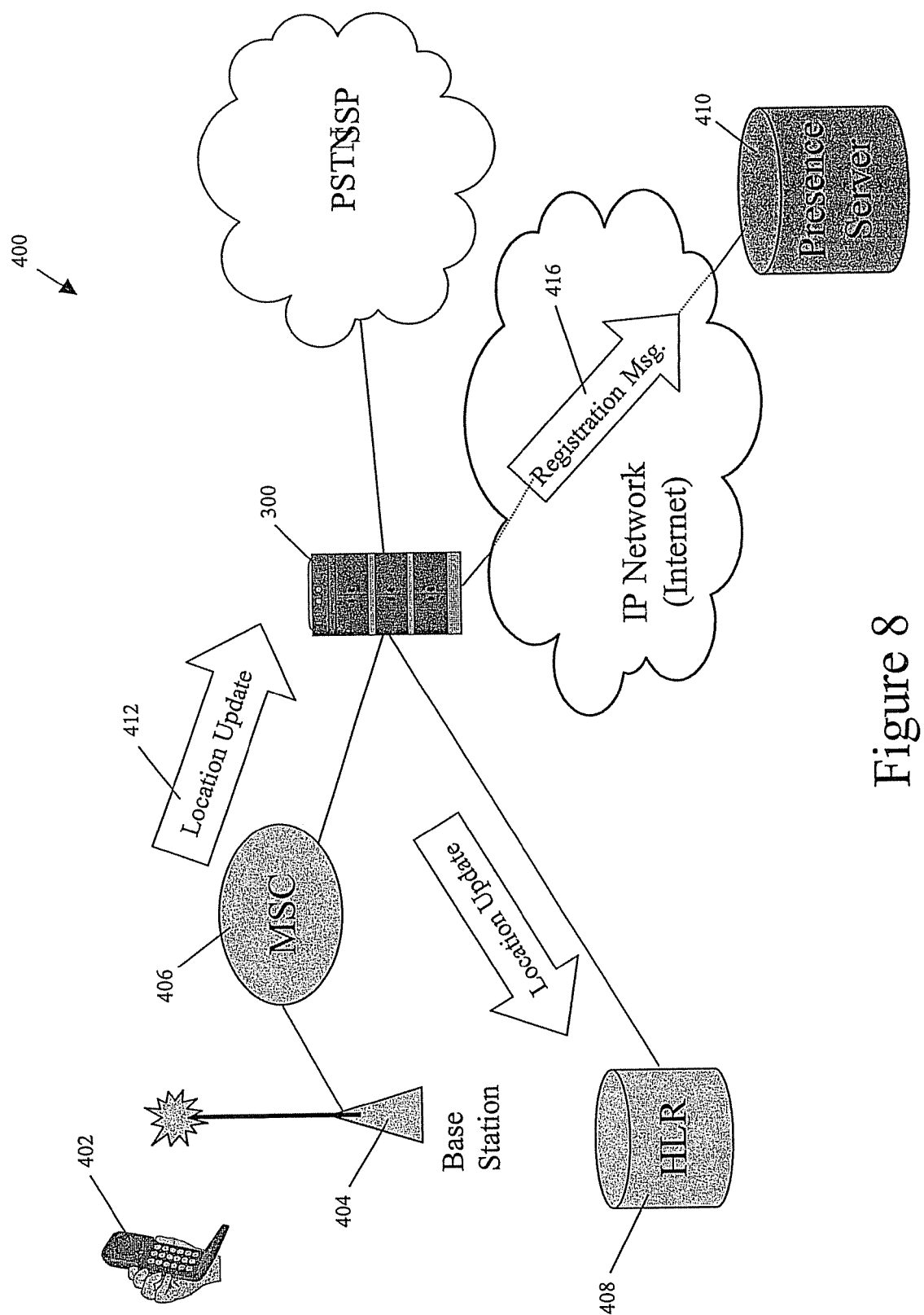
FIG. 8 is a block diagram illustrating the operation of a presence registration and routing node in a mobile telecommunications network according to an embodiment of the present invention.
Figure 9:
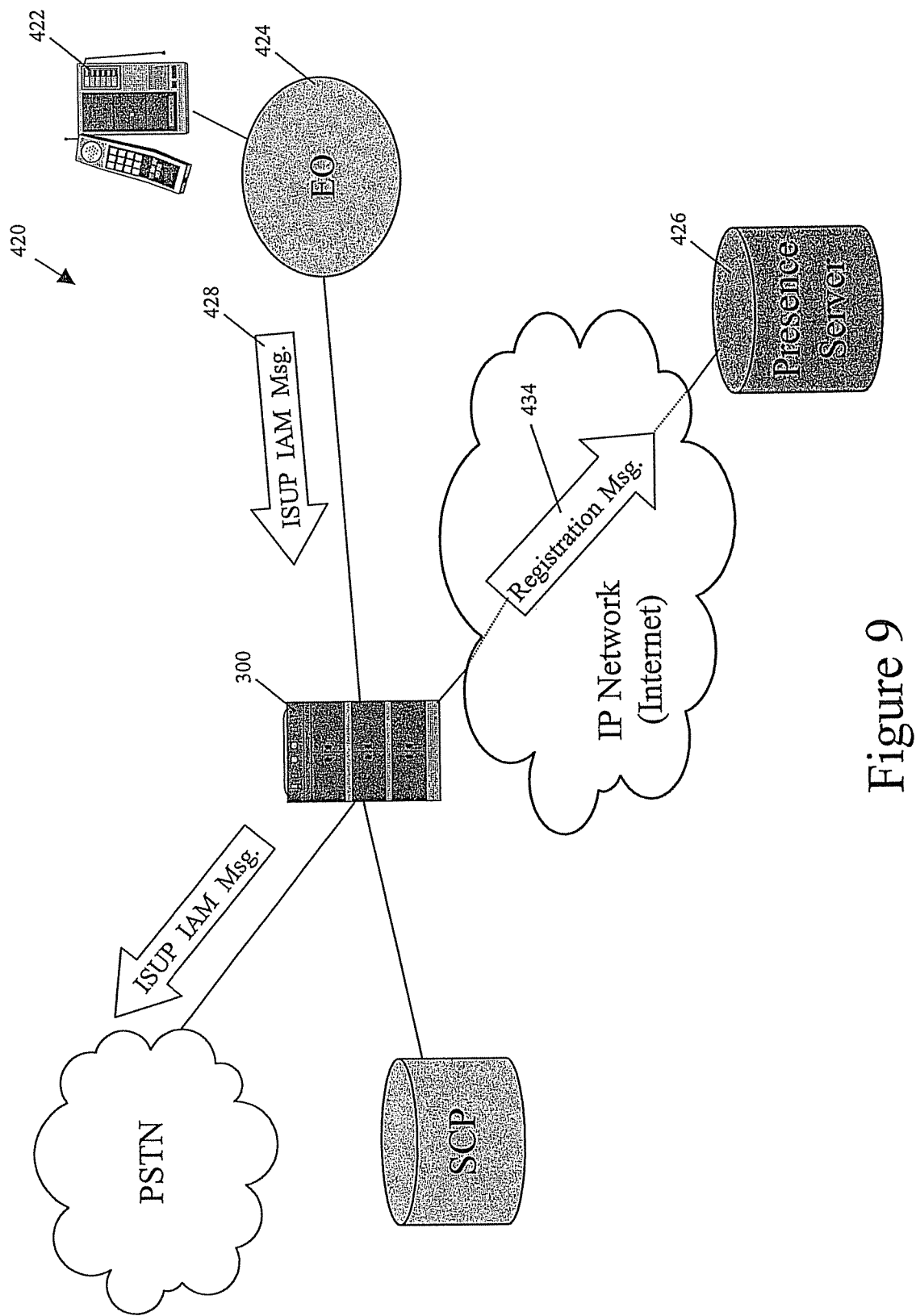
FIG. 9 is a block diagram illustrating the operation of a presence registration and routing node in processing an IAM message according to an embodiment of the present invention.
Figure 10:
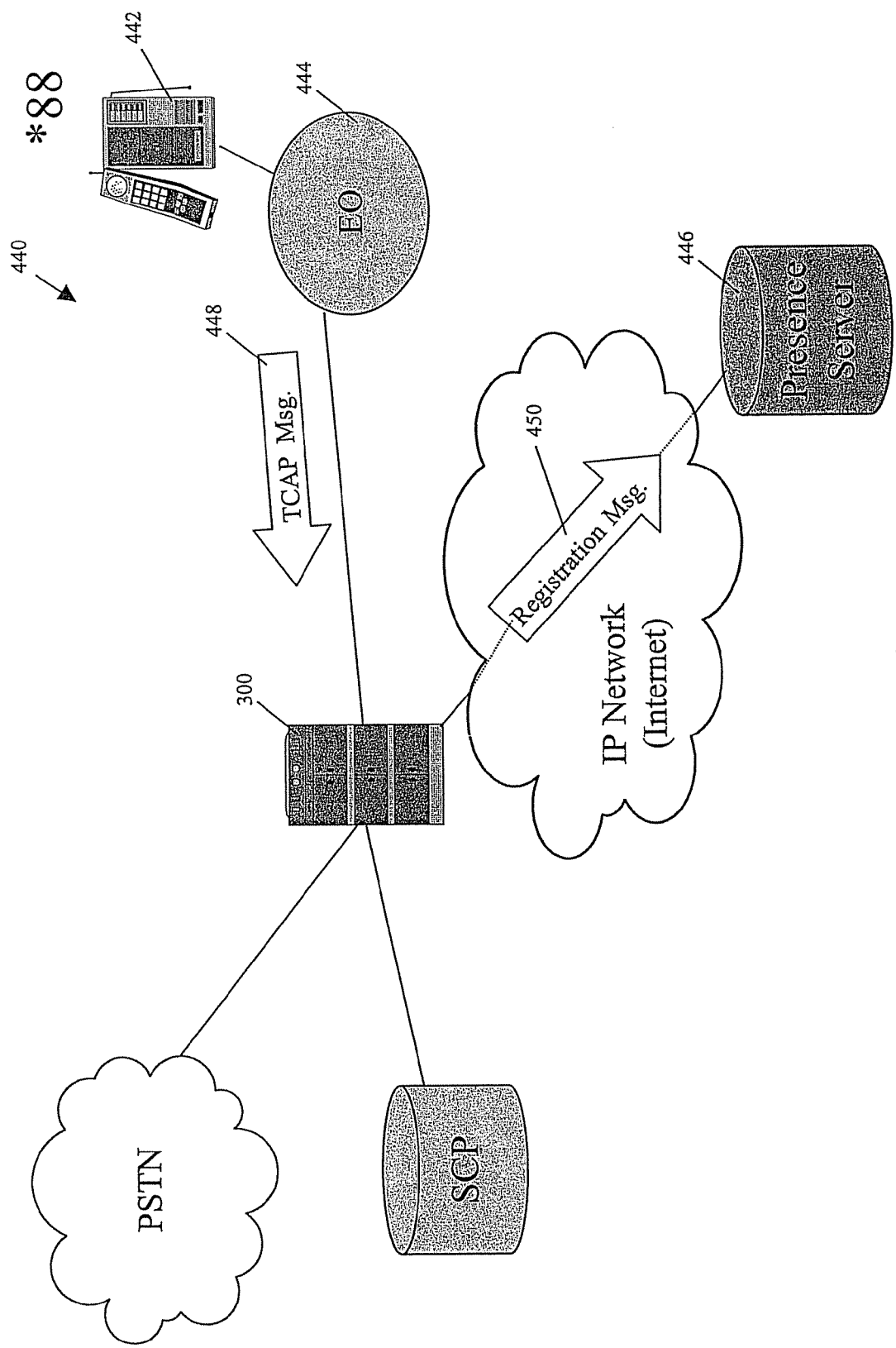
FIG. 10 is a block diagram illustrating the operation of a presence registration and routing node for in processing a TCAP message according to an embodiment of the present invention.

Shown in FIGS. 8, 9 and 10 are simplified network diagrams that illustrate example implementations of the embodiments described above. More particularly, FIG. 8 illustrates an implementation of the presence registration and routing node 300 of the present invention in a mobile or wireless telecommunications environment, generally indicated by the numeral 400. Network 400 includes a mobile subscriber 402, a base station complex 404, a mobile switching center (MSC) 406, a home location register (HLR) 408, and a presence server 410. It will be appreciated that the message flows shown in FIG. 8 indicate that the presence registration and routing node 300 formulates and transmits a presence registration message 416 in response to the receipt of a location update message 412 that is sent from the MSC 406. Those skilled in the art of wireless telecommunications will appreciate that an MSC performs a number of functions in a wireless network, including the formulation and routing of signaling messages. In the example shown in FIG. 8, the location update signaling message used by the presence registration and routing node 300 to trigger the presence registration message 416 is destined for the HLR node 408. In such a wireless scenario, the presence registration message 416 could be formulated and transmitted by the presence registration and routing node in response to a mobile location update message associated with the registration of a wireless customer in a particular cell or service area. Once again, those skilled in the art of wireless or mobile telecommunications will appreciate that wireless or mobile signaling messages are generated and transmitted within a wireless network in response to the powering-up or turning-on of a customer's wireless phone, as well as in response to inter-cell movement of a mobile subscriber during the course of a mobile call. As such, the presence registration and routing node of the present invention facilitates a method of presence registration that is completely transparent to the cell or mobile phone user.

FIG. 9 illustrates an implementation of the presence registration and routing node 300 of the present invention in a wired telecommunications environment, generally indicated by the numeral 420. Network 420 includes a wireline subscriber 422, an end office (EO) 424, and a presence server 426. It will be appreciated that the message flows shown in FIG. 9 indicate that the presence registration and routing node 300 formulates and transmits a presence registration message 434 in response to the receipt of an ISUP call signaling message from the EO 424. More particularly, the presence registration message 434 is generated in response to the receipt of an ISUP Initial Address Message (IAM) message 428. Those skilled in the art SS7 signaling will appreciate that an ISUP IAM message is the first in a sequence of ISUP formatted SS7 call control signaling messages that are required to complete a phone call in the Public Switched Telephone Network (PSTN). As such, it will be appreciated that in the scenario illustrated in FIG. 9, the presence registration message 434 is formulated in response to an attempt by the wireline subscriber 422 to place a telephone call. As presence registration message generation is triggered by an ISUP IAM message, it will be appreciated by those skilled in the art of SS7 telecommunications that completion of an attempted telephone call is not required in order for a presence registration message to be generated and transmitted to a presence server. Thus, any call attempts by the wireline subscriber 422 will effectively register the subscriber's presence with the presence server 426 via the presence registration and routing node 300 of the present invention. It will also be appreciated from FIG. 9, that the triggering ISUP IAM message 428 is subsequently routed as normal, on to a destination address specified in the message.

Shown in FIG. 10 is a variation of the scenario that was illustrated in FIG. 9 whereby an SS7 signaling message used to trigger the formulation and subsequent transmission of a presence registration message is comprised of a TCAP-type message instead of an ISUP-type message. Shown in FIG. 10 is an implementation of the presence registration and routing node 300 of the present invention in a wired telecommunications environment, generally indicated by the numeral 440. Network 440 includes a wireline subscriber 442, an end office (EO) 444, and a presence server 446. In the particular embodiment shown in FIG. 10, it is assumed that the wireline subscriber 442 indirectly initiates a TCAP message 448 by dialing "*88" or a similar code on a telephone keypad. Once again, those skilled in the art of SS7 telecommunication networks will appreciate that generation of such TCAP messages is accomplished by an End Office (EO) or Service Switching Point (SSP) in response to the "*88" keystrokes, as generally indicated in FIG. 10. As such, by dialing "*88" the wireline subscriber 442 is effectively manually registering their presence with the presence server via the generation of the TCAP message 448, which in turn causes the generation of a presence registration message 450 by the presence registration and routing node 300 of the present invention.

Integrated Presence Database System

Figure 11:
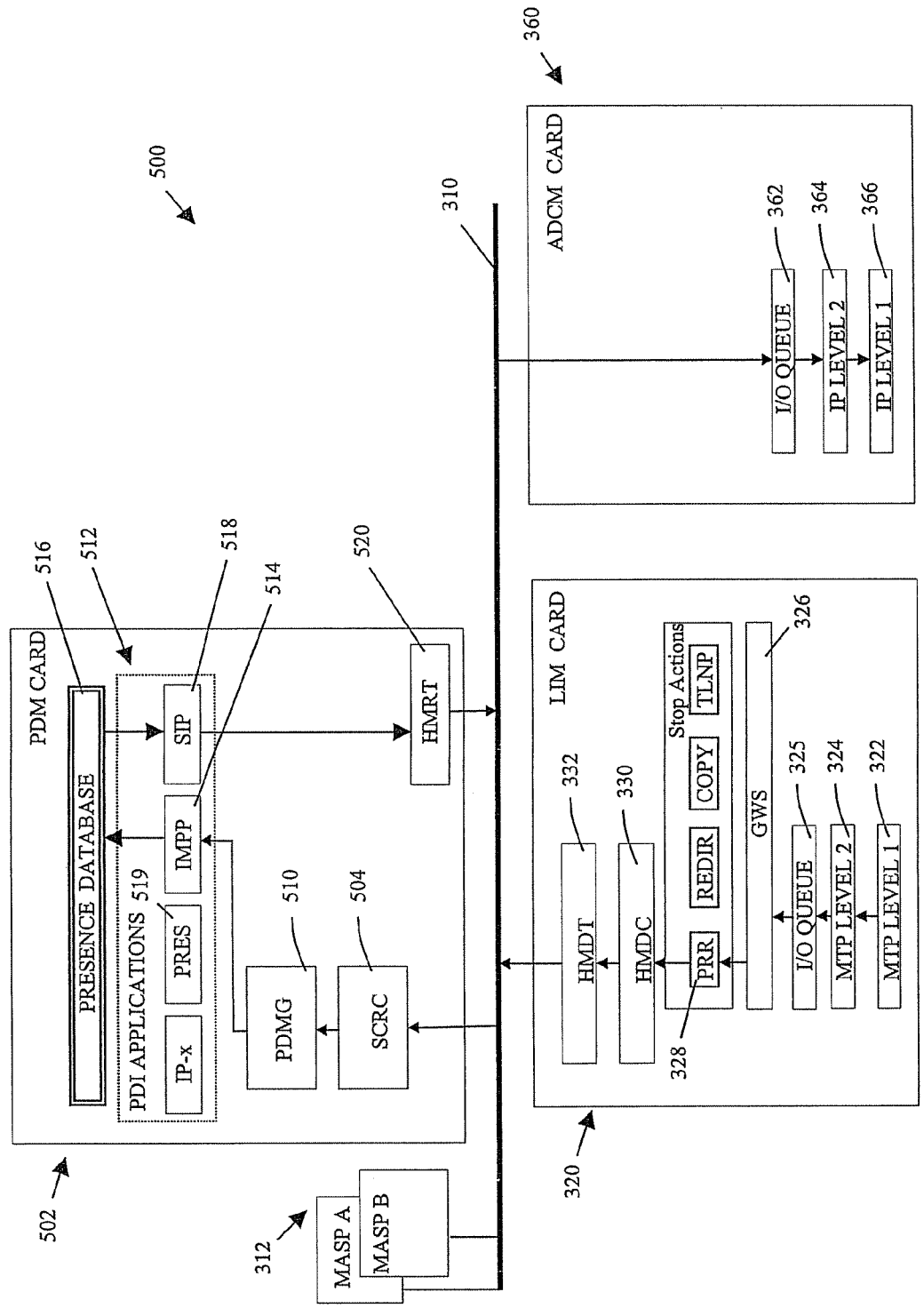
FIG. 11 is a block diagram of a presence registration and routing node including an internal presence database according to an embodiment of the present invention.

The embodiments of the present invention described in detail above can be easily extended to include a presence registration and routing node that is capable of maintaining a presence database system. One embodiment of such a presence registration and routing node is illustrated in FIG. 11, and generally indicated by the numeral 500. It will be appreciated that in the particular embodiment presently contemplated, presence registration messages are not formulated and routed from the node, but instead presence registration takes place at or within the node. That is, in the embodiment of the present invention shown in FIG. 11 and generally discussed below, the functionality of a presence server is generally included within the presence registration and routing node 500.

With particular regard to the embodiment illustrated in FIG. 11 and in a manner similar to the embodiment described above, it will be appreciated that presence registration and routing node 500 includes a high speed Interprocessor Message Transport (IMT) communications bus 310. Communicatively coupled to IMT bus 310 are a number of distributed processing modules or cards including; a pair of Maintenance and Administration Subsystem Processors (MASPs) 312, an SS7 capable Link Interface Module (LIM) 320, an IP capable Advanced Database Communication Module (ADCM) 360, and a Presence Database Module (PDM) 502. These modules are physically connected to the IMT bus 310 such that signaling and other type messages may be routed internally between all active cards or modules. For simplicity of illustration, only a single LIM 320, ADCM 360, and PDM 502 are included in FIG. 11. However, it should be appreciated that the distributed, multi-processor architecture of the presence registration and routing node 500 facilitates the deployment of multiple LIM, ADCM, PDM, and other cards, all of which could be simultaneously connected to the IMT bus 310.

As in the previously described embodiment, MASP pair 312 implement the overall maintenance and administration subsystem functions. For a comprehensive discussion of additional MASP operations and functionality, the above-referenced Tekelec publications can be consulted.

Once again, it will be appreciated that LIM 320 is comprised of a number of sub-component processes including, but not limited to; an SS7 MTP level 1 process 322, an SS7 MTP level 2 process 324, an I/O buffer or queue 325, a gateway screening (GWS) process 326, a Presence Server Request (PRR) stop action process 328, an SS7 MTP level 3 layer HMDC process 330, and an HMDT process 332. MTP level 1 and 2 processes 322 and 324, respectively, provide the facilities necessary to send and receive digital data over a particular physical media/physical interface, as well as to provide error detection/correction and sequenced delivery of all SS7 message packets. I/O queue 325 provides for temporary buffering of incoming and outgoing signaling message packets. GWS process 326 is responsible for examining the incoming signaling message and determining which, if any, of the provisioned stop actions are applicable. PRR stop action process 328 is responsible for making a copy of, and subsequently encapsulating, an incoming SS7 ISDN User Part (ISUP) IAM signaling message packet within an SS7 Signaling Connection Control Part (SCCP) formatted packet. It should be appreciated that PRR stop action process 328 could also be configured to simply encapsulate the original incoming SS7 ISUP IAM signaling message, without making a copy. MTP level 3 HMDC process 330 receives signaling messages from the lower processing layers and performs a discrimination function, effectively determining whether an incoming SS7 message packet requires internal processing or is simply to be through switched. For instance, in the case of an SS7 TCAP message associated with presence registration or an SCCP encapsulated ISUP IAM message, HMDC process 330 would determine that the message should be internally routed for further processing. The HMDT process 332 manages or directs the internal routing of SS7 message packets that require additional processing prior to final routing. Once again, it should be appreciated that a LIM card may contain more functional processes than those described above. The above discussion is limited to LIM functionality associated with the basic processing of in-bound signaling messages.

As such, it will be appreciated that the three functional processes associated with an Advanced Database Communication Module (ADCM) 360 shown in FIG. 11 are simply those processes that are relevant to a discussion of out-bound ADCM operation in the examples of PS routing node operation disclosed herein. Furthermore, it will be appreciated that ADCM 360 is similar in function to the DCM application module described above. In the case of ADCM 360, the message packets processed by the card need not be native SS7 type messages that have been encapsulated in an IP packet. Instead, the ADCM 360 is capable of processing, transmitting, and receiving both native SS7 and native IP protocol messages.

The processes explicitly shown on the out-bound ADCM 360 include an I/O queue 362 and IP level 1 and 2 processes 366 and 364, respectively. I/O queue 362 facilitates temporary buffering of incoming and outgoing signaling message packets, while IP addressing operations are performed by the IP level 1 and 2 processes 366 and 364, respectively.

Once again, the description of LIM and ADCM sub-components provided in the above description is limited to those sub-components that are relevant to the sample implementation scenarios discussed herein. For a comprehensive discussion of additional LIM and ADCM-type operations and functionality, the above-referenced Tekelec publications can be consulted.

In general, a PDM card includes the database and database control processes necessary to facilitate the presence registration and query handling functionality of the contemplated embodiment of the present invention. The PDM 502 shown in FIG. 11 is comprised, in part, of an SCCP subsystem controller known as a Signaling Connection Routing Controller (SCRC) process 504, a Presence Database Manager (PDMG) process 510, and a number of Presence Database Interface (PDI) Applications generally indicated by the numeral 512. Included among the PDI Applications 512 are session initiation protocol (SIP) application process 518, IMPP application process 514, and presence protocol process 519. The SCRC process 504 is responsible for discrimination of signaling messages and subsequent distribution of these signaling messages to an appropriate higher processing level application or function. In the configuration shown in FIG. 11, the next highest processing level is represented by the PDMG process 510. PDMG process 510 is generally responsible for determining which of the provisioned protocol-specific PDI Applications 512 is required process the incoming message packet. For instance, if the incoming presence registration packet contained a TCAP or SCCP-encapsulated IMPP message, PDMG process 510 would determine that the provisioned PDI application 514 was required for successful processing. As will be appreciated from FIG. 11, a number of PDI applications 512 may be simultaneously provisioned on a single PDMG card. These protocol-specific PDI applications may be configured such that each application is capable of receiving presence registration or query messages that are formatted in different protocols including, but not limited to, SIP, IMPP, and the presence protocol. Furthermore, these PDI applications 512 are also capable of generating or formatting protocol-specific presence service related response messages. Such a presence service response message might include, but is not limited to, a message that provides presence status information for a specific user in response to a presence status query. This particular scenario is specifically illustrated in FIG. 11, where the presence status query packet assumes the form of an SS7 TCAP-encapsulated IMPP query message and the subsequent presence status response is contained within a SIP formatted message.

Once again, while any number or variety of PDI applications may be provisioned on a single PDM card, only the IMPP, SIP, and presence protocol PDI applications 514, 518, and 519, respectively, are described herein. SIP PDI application 518 essentially contains the logic necessary to process incoming SIP presence messages and construct outgoing SIP presence response messages. Similarly, IMPP PDI application 514 contains the logic necessary to process incoming IMPP formatted presence messages and construct outgoing IMPP formatted presence response messages. Presence PDI application 519 contains the logic necessary to process incoming presence query messages formatted according to the presence protocol and construct outgoing presence response messages formatted according to the presence protocol.

Also included in FIG. 11 is a general message flow associated with the processing of an incoming SS7 TCAP-encapsulated IMPP formatted presence query message and the subsequent, related presence system processing activity. A detailed flow chart of the major steps associated with a TCAP-encapsulated IMPP presence query scenario is presented in FIG. 12, and may be used in conjunction with the schematic diagram shown in FIG. 11 to better understand the operation of presence registration and routing node 500.

With particular regard to the scenario generally illustrated in FIG. 11, it is assumed that an incoming TCAP-encapsulated IMPP formatted presence query message is received at the inbound LIM module 320 (ST1). Once again, in steps ST2 and ST3, the incoming TCAP-encapsulated IMPP formatted presence query message is received and processed by the MTP Level 1 and 2 processes 322 and 324, respectively. With MTP Level 1 and 2 processing complete, the signaling message packet is temporarily buffered in the I/O queue 325 before being passed up the stack to the MTP Level 3 Gateway Screening (GWS) process 326. As indicated in step ST4, GWS process 326 examines the incoming TCAP presence query message and determines not only whether the message is to be allowed into the switch for further processing, but also which, if any, of the provisioned stop actions are applicable to the incoming message. In the scenario shown in FIG. 11, GWS process 326 examines the incoming TCAP-encapsulated IMPP presence query message and determines that the message is permitted to enter the switch. Furthermore, upon examination of the Originating Point Code (OPC), Destination Point Code (DPC) and Service Indicator Octet (SIO) fields contained in the MTP routing layer, it is determined that the message does not require additional processing by the PRR stop action 328. As such, the TCAP MSU is then routed directly to HMDC process 330 where SCCP type processing is performed (ST5). In the example shown in FIG. 11, HMDC process 330 examines the message packet and determines that the DPC and Subsystem Number (SSN) of the TCAP packet is the PC and SSN of the internal presence server database system that is located on PDM card 502. Consequently, further processing of the TCAP MSU within the routing node is assumed to be necessary, and the packet is passed to the HMDT process 332. The HMDT process 332 examines the Service Indicator (SI) field of the TCAP MSU, which indicates that the packet is of an SCCP type. As such, HMDT process 332 places the TCAP MSU on high speed IMT bus 310 for transport to PDM 502 and subsequent presence database service.

In step ST6, the TCAP MSU is received and examined by SCRC process 504 that is resident on PDM 502. SCRC process 504 examines the message, determines that presence database service is indicated, and forwards the TCAP MSU to the PDMG process 510. As indicated in step ST7, the message packet is examined to determine the protocol of the presence related message. In this case, the protocol of the presence related message encapsulated within the TCAP packet is IMPP. Next in step ST8 the variety or type of presence service associated with the message is evaluated. Such general presence message types or varieties might include, but are not limited to, query and registration type messages.

Once again, in this example, the IMPP-formatted presence service message is a query message that is intended to extract information from a presence service database. As such, the IMPP formatted query message is directed to IMPP application 514 for further processing. IMPP application 514 examines the message and, using information contained within the packet, directs the query to presence database 516 (ST9). Presence database 516 processes the query and, in this example, returns the requested information to SIP application 518 for formatting of the out-bound response message (ST10).

With the necessary SIP formatting complete, the SIP-formatted presence registration message is passed to an HMRT process 520. HMRT process 520 determines to which ADCM card the SIP registration message packet should be routed for subsequent outbound transmission (ST11). In this case, the HMRT process 520 determines that the desired outbound signaling link associated with the routing of the SIP registration message is located on ADCM 360. Consequently, the SIP message packet is internally routed across the IMT bus 310 to LIM 360, where it is generally received by the I/O queue process 362 (ST12). Eventually, the modified message packet is passed from the I/O queue 362 on to the IP Level 2 and Level 1 processes 364 and 366, respectively. As indicated in step ST13, the SIP-formatted presence registration message is then transmitted into an IP network for ultimate delivery to and use by a presence database system.

Figure 12:
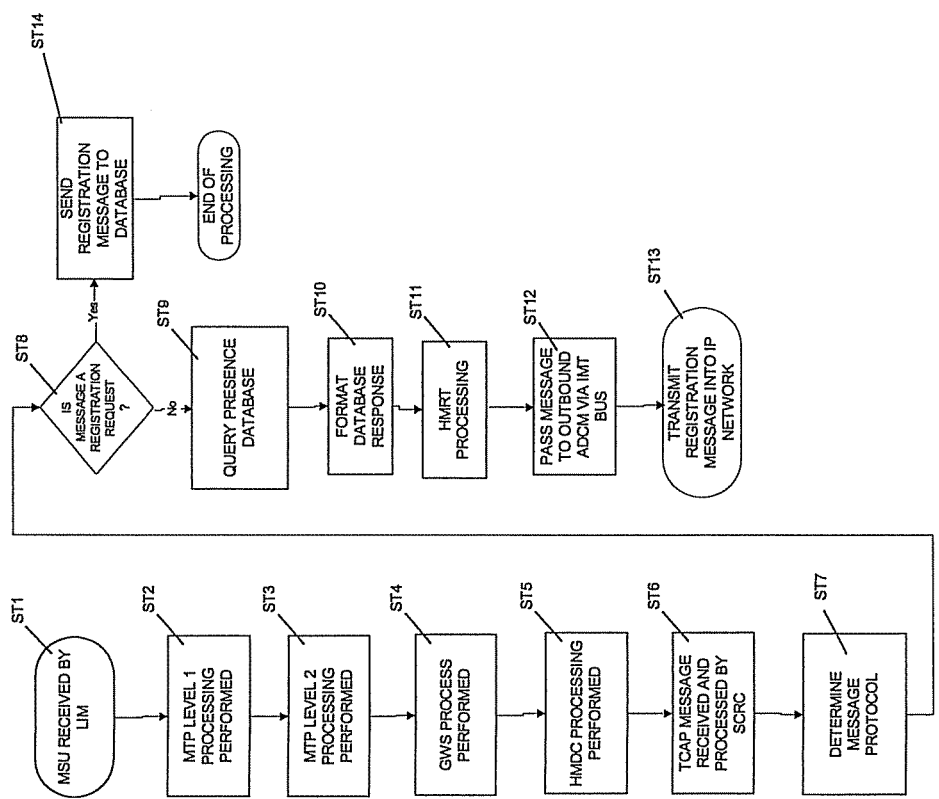
FIG. 12 is a flow chart illustrating exemplary steps that may be performed by the presence registration and routing node illustrated in FIG. 11 in responding to a presence query for updating presence information according to an embodiment of the present invention.

It will be appreciated from FIG. 12, that if the IMPP-formatted presence service message were a registration request-type message, then IMPP application 514 would examine the message and, using information contained within the packet, direct the registration request to presence database 516 (ST14). In such a scenario, a response or acknowledgment message may not necessarily be required.

Externally Mounted Presence Database System

Figure 13:
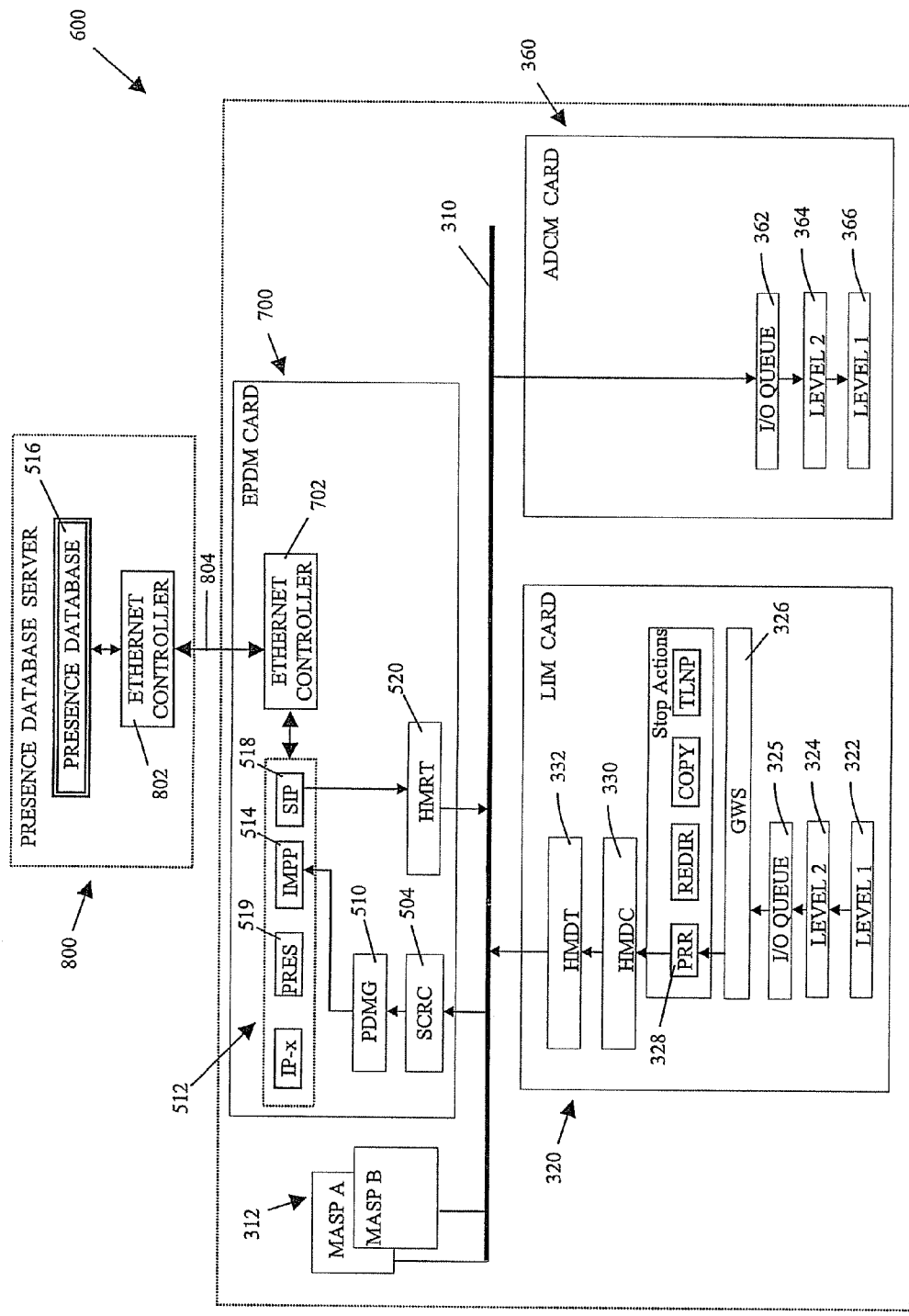
FIG. 13 is a block diagram of a presence registration and routing node including an external presence database according to an embodiment of the present invention.

The embodiments of the present invention described in detail above can be easily extended to include a presence registration and routing node that incorporates an externally mounted presence database system or server platform. One embodiment of such a presence registration and routing node is illustrated in FIG. 13, and generally indicated by the numeral 600. Once again, it will be appreciated that in the particular embodiment presently contemplated, presence registration messages are not formulated and routed from the node, but instead presence registration takes place at or within the node.

With particular regard to the embodiment illustrated in FIG. 13 and in a manner similar to the embodiment described above, it will be appreciated that presence registration and routing node 600 includes a high speed Interprocessor Message Transport (IMT) communications bus 310. Communicatively coupled to IMT bus 310 are a number of distributed processing modules or cards including: a pair of Maintenance and Administration Subsystem Processors (MASPs) 312, an SS7 capable Link Interface Module (LIM) 320, an IP capable Advanced Database Communication Module (ADCM) 360, and an External Presence Database Module (EPDM) 700. As further indicated in FIG. 13, EPDM is connected to an external Presence Database Server platform 800 via a high-speed Ethernet-type connection 802. In this embodiment, external Presence Database Server platform 800 includes the actual Presence Database entity 516. With exception of the EPDM card 700 and external Presence Database Server 800, all other functional and operational aspects of the embodiment shown in FIG. 13 are identical to that of the embodiment shown in FIG. 11 and generally described above.

In general, an EPDM card 700 includes the database and database control processes necessary to facilitate the presence registration and query handling functionality of the contemplated embodiment of the present invention. The EPDM 700 shown in FIG. 13 is comprised, in part, of an SCCP subsystem controller known as a Signaling Connection Routing Controller (SCRC) process 504, a Presence Database Manager (PDMG) process 510, and a number of Presence Database Interface (PDI) Applications generally indicated by the numeral 512. Included among the PDI Applications 512 are a session initiation protocol (SIP) application process 518, an IMPP application process 514, and a presence protocol process 519. The SCRC process 504 is responsible for discrimination of signaling messages and, subsequent distribution of these signaling messages to an appropriate higher processing level application or function. In the configuration shown in FIG. 13, the next highest processing level is represented by the PDMG process 510. PDMG process 510 is generally responsible for determining which of the provisioned protocol-specific PDI Applications 512 is required process the incoming message packet. The PDI applications 512 are capable of generating or formatting protocol-specific presence service related response messages. Such a presence service response message might include, but is not limited to, a message that provides presence status information for a specific user in response to a presence status query.

In the embodiment shown in FIG. 13, EPDM card 700 further includes an Ethernet Controller (EC) process 702 which is communicatively coupled to the provisioned PDI applications 512 and also to the external Presence Database Server 800. More particularly, EC 702 is coupled to a corresponding EC process 802 that resides on the external Presence Database Server 800. ECs 702 and 802 facilitate the communication of messages between the PDI applications 512 and the Presence Database 516. In all other respects, operation of the presence registration and routing node is identical to that of presence registration and routing node 500 described above and illustrated in FIG. 11.

Integrated Message Accounting and Billing Subsystem

Figure 14:
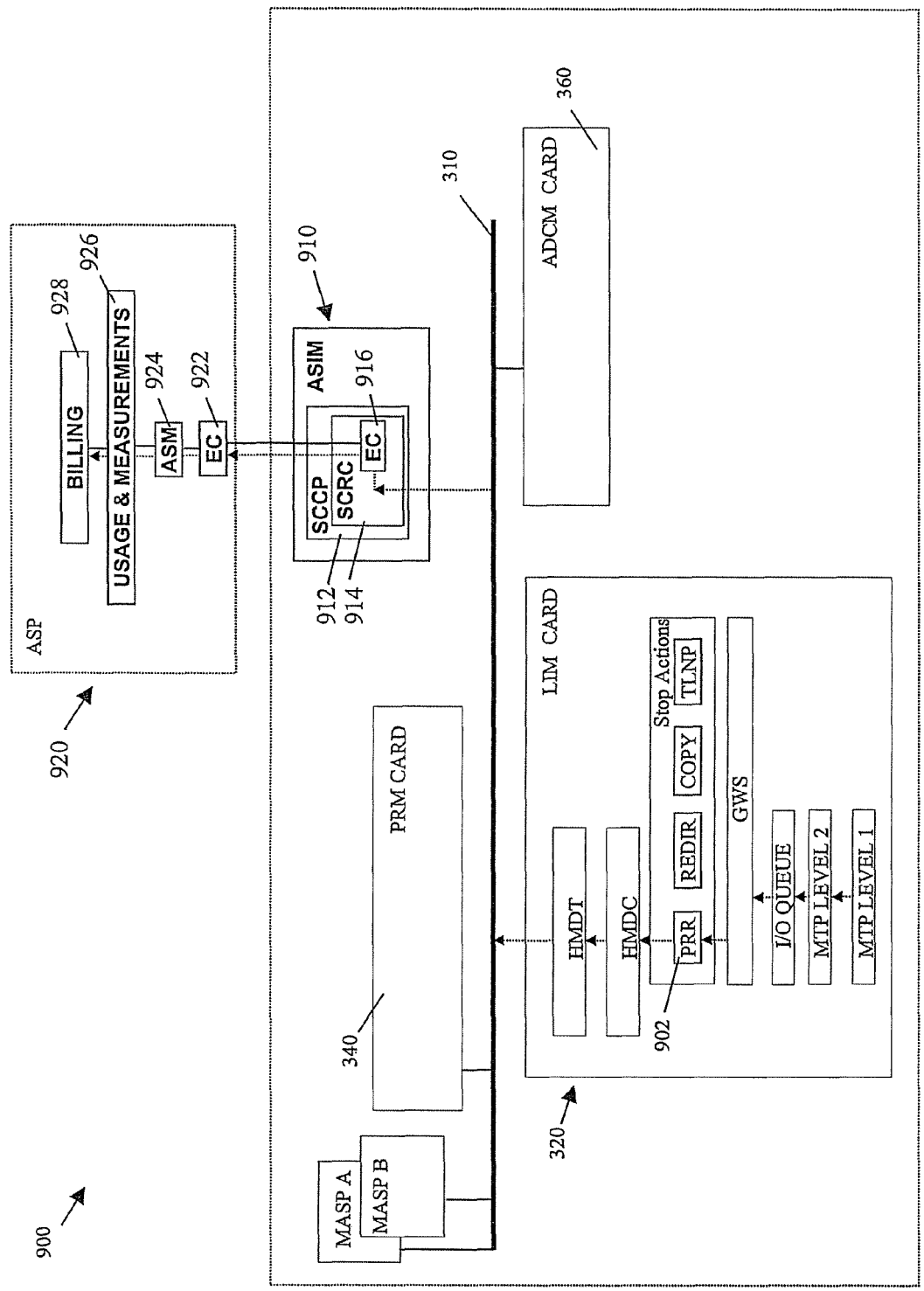
FIG. 14 is a block diagram of a presence registration and routing according to an embodiment of the present invention that includes a message accounting and billing subsystem.

Shown in FIG. 14 is another embodiment of a presence registration and routing node of the present invention, generally indicated by the numeral 900. With particular regard to the embodiment illustrated in FIG. 14 and in a manner similar to the embodiment described above, it will be appreciated that presence registration and routing node 900 includes a high speed Interprocessor Message Transport (IMT) communications bus 310. As in the previously described embodiments, communicatively coupled to IMT bus 310 are a number of distributed processing modules or cards including; a pair of Maintenance and Administration Subsystem Processors (MASPs), an SS7 capable Link Interface Module (LIM) 320, and an IP capable Advanced Database Communication Module (ADCM) 360, and a Presence Registration Module (PRM) 340. Further included in the presence registration and routing node 900 is an accounting and billing subsystem which is comprised of an accounting subsystem interface module (ASIM), generally indicated by the numeral 910, and an accounting server platform (ASP), generally indicated by the numeral 920. It will be appreciated that the combination of ASIM card 910 and ASP accounting server 920 includes the database and control processes necessary to achieve the accounting and billing functionality of the present invention.

From a practical implementation standpoint. ASP 920 could assume the form of a Sun Workstation or similar type computing platform. It will be further appreciated that an entire message accounting subsystem could also be integrated within a presence routing and registration node.

The ASIM card 910 shown in FIG. 14 includes a Signaling Connection Control Part (SCCP) subsystem 912 that is responsible for receiving and preliminary processing of incoming SCCP encapsulated accounting message packets. ASIM card 910 also includes an SCCP controller known as a Signaling Connection Routing Controller (SCRC) process 914 and a high-speed Ethernet Controller (EC) process 916. Once again, as described above, the SCCP subsystem 912 is responsible for receiving and preliminary processing of incoming SCCP encapsulated message packets, while the SCRC process 914 is responsible for discrimination and subsequent distribution of messages based on information contained in an SCCP packet. In the case of ASIM card 910, messages that satisfy the SCRC discrimination criteria are distributed or directed to the high-speed Ethernet Controller process 916. EC process 916 is in turn responsible for controlling the process of communicating messages, via an Ethernet connection to and from the associated ASP server 920. More particularly, ASP server 920 includes a corresponding high-speed Ethernet Controller process 922 that serves as the communications interface between ASIM card 910 and an on-board accounting server manager (ASM) process 924. ASM process 924 is responsible for the de-capsulation or removal of the SCCP envelope that contains the accounting message. The de-capsulated accounting message is then passed to an adjacent usage and measurements process 926 where usage and measurement statistics are created and stored in a usage and measurements database (UMD) process 930, such as that shown in FIG. 15.

Usage and measurements statistics produced by such a process could include, but are not limited to, peg counts of messages received from a specific network address, a specific service provider, a specific service user, a specific IP socket, or a specific signaling link. Furthermore, information specific to the type of service requested, calling and called party information, and other information associated with a communication that could be useful in generating a bill or invoice may also be stored in a UMD. As shown in sample UMD process 930, in one simplified embodiment, each communication is identified by a transaction ID, and certain predetermined information associated with a communication can be stored in the database. It will be appreciated that the information contained in a UMD database could be significantly more or less detailed than that indicated in the example shown in FIG. 15.

In any event, such statistics could include information associated with the time-of-day that a message was received, the duration of a "call" or communication, general quality of service (QoS) indicators associated with a "call" or communication, information related to or identifying the type of service that is associated with a "call" or communication (i.e., broadband service related, call setup related, database query related, etc.). Such usage information could be used to bill a subscriber at different rates depending upon the type of service requested. With such capability included within a presence server and routing node, network operators greatly increased flexibility with regard to service-specific billing, without significantly increasing network OA&M requirements.

In order to facilitate such billing operations. ASP server 920 also includes a billing process 928 that is adapted to extract information stored by the usage and measurements process 926 and subsequently generate bills. Once again, information or parameters maintained by process 926 that may be used in the generation of bills could include, but is not limited to, a network address identifier, a service provider identifier, a service user identifier, an IP socket identifier, a signaling link identifier, and a service type identifier. It will be further appreciated that a network address identifier could include, but is not limited to a destination or origination SS7 point code, a destination or origination IP address, and a destination or origination domain name. Similarly, a user identifier could include, but is not limited to a calling or called party telephone number, and a destination or origination email address.

In the particular embodiment shown, LIM card 320 includes a Presence Registration Request (PRR) stop action process 902, that is functionally similar to the PRR process 328 described above. In addition to generate, and SCCP encapsulate an accounting message that is subsequently passed via IMT bus 310 to ASIM 910 of the accounting and billing subsystem.

In a preferred embodiment, a normalized accounting message (NAM) format is employed to provide the necessary message information content to the associated accounting and billing subsystem. That is, a NAM formatted accounting message employs a field or record structure that is essentially a superset of all parameters of interest from all signaling, presence and instant messaging protocols of interest. As such, parameters of interest in a SIP formatted signaling message can be easily accommodated in a NAM accounting message, as can parameters of interest in an SS7 formatted signaling message. It will be further appreciated that the NAM format can be periodically expanded (or revised) to accommodate new or evolving signaling protocols that must be supported by a presence registration and routing node of the present invention. LIM card 320 can also be configured to simply encapsulate a copy of the received signaling message packet and forward the packet to the associated accounting and billing subsystem.

With regard to the message encapsulation discussed above, it should be appreciated that SCCP encapsulation of a NAM message is not essential to the operation of the message accounting subsystem of the present invention. Other internal encapsulating protocols could be just as easily employed, provided that a suitably provisioned ASIM module is capable of receiving and processing the encapsulated messages. In fact, no encapsulation necessarily need be performed, so long as the accounting message generated by a PRR type process can be received and generally processed by a suitable configured ASIM module.

Figure 16:
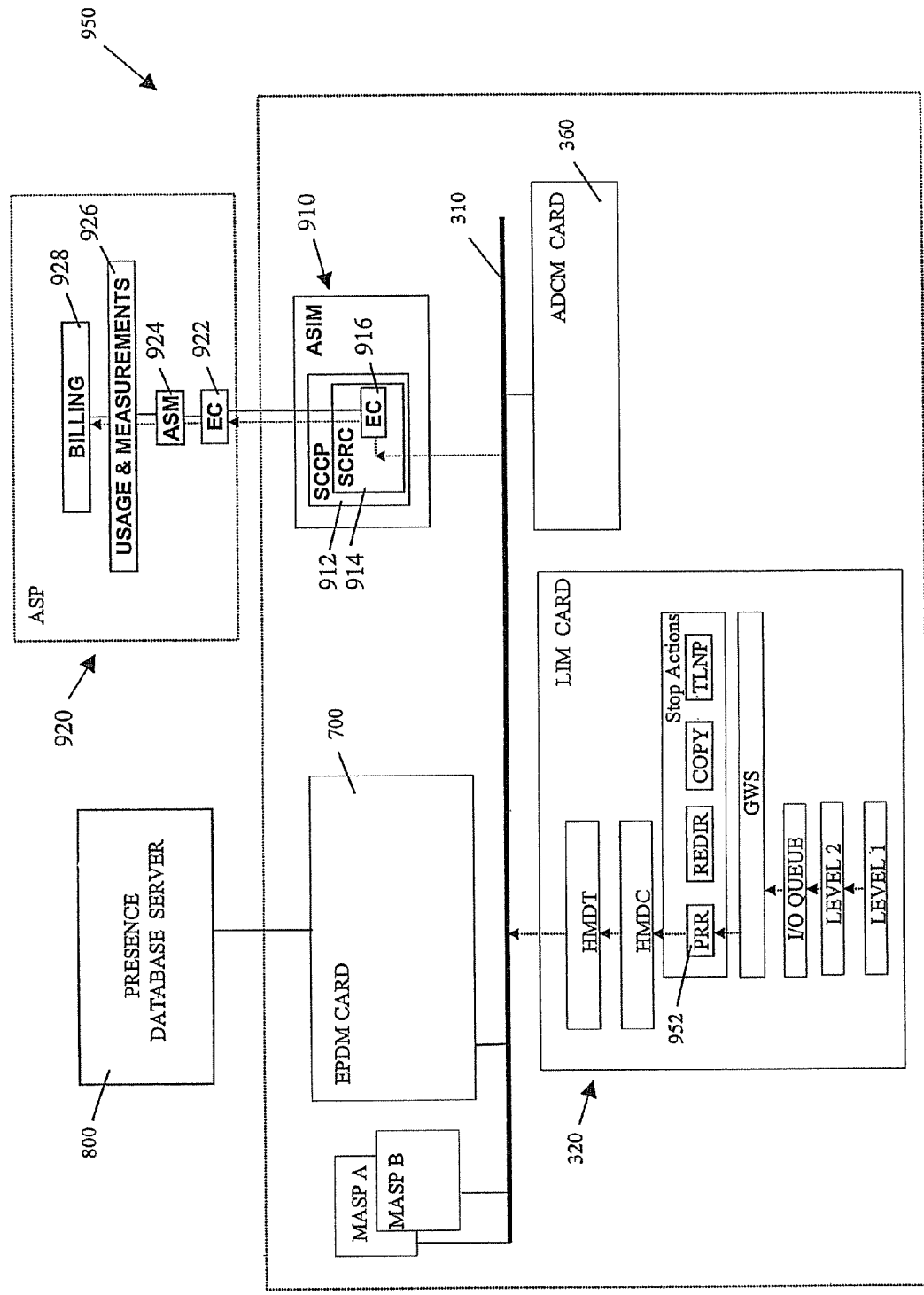
FIG. 16 is a block diagram of a presence registration and routing according to an embodiment of the present invention that includes a presence database and message accounting and billing subsystem.

FIG. 16 illustrates yet another embodiment of a presence registration and routing node of the present invention, which extends the integrated accounting and billing subsystem concept to the routing node previously presented in FIG. 11. This new embodiment of a presence server and routing node is generally indicated by the numeral 950. With particular regard to the embodiment illustrated in FIG. 16 and in a manner similar to those embodiments described above, it will be appreciated that presence registration and routing node 950 includes a high speed Interprocessor Message Transport (IMT) communications bus 310. Communicatively coupled to IMT bus 310 are a number of distributed processing modules or cards including; a pair of Maintenance and Administration Subsystem Processors (MASPs), an SS7 capable Link Interface Module (LIM) 320, and an IP capable Advanced Database Communication Module (ADCM) 360, and a Presence Registration Module (PRM) 340. Further included in the presence registration and routing node 950 is an accounting and billing subsystem which is comprised of an accounting subsystem interface module (ASIM), generally indicated by the numeral 910, and an accounting server platform (ASP), generally indicated by the numeral 920. Again, it will be appreciated that the combination of ASIM card 910 and ASP accounting server 920 includes the database and control processes necessary to achieve the accounting and billing functionality of the present invention.

In the particular embodiment shown, LIM card 320 includes a Presence Registration Request (PRR) stop action process 952, that is functionally similar to the PRR process 902 described above. PRR 952 is adapted to generate, and SCCP encapsulate, an accounting message that is subsequently passed via IMT bus 310 to ASIM 910 of the accounting and billing subsystem, where accounting and billing subsystem processing occurs in a manner similar to that described above.

It will be understood that various details of the invention may be changed without departing from the scope of the invention. Furthermore, the foregoing description is for the purpose of illustration only, and not for the purpose of limitation—the invention being defined by the claims.

What is claimed is:

1. A presence registration and routing node for providing presence information regarding an entity, the presence registration and routing node comprising:
    (a) an advanced database communications module for receiving a session initiation protocol (SIP)-formatted presence registration message for determining presence information for a first end user, the presence information indicating a communication medium for contacting the first end user using a text messaging protocol and the fact that the first end user is currently available to receive text messaging protocol messages via the communications medium, wherein the SIP-formatted presence registration message is generated in response to a location update message received from a sending mobile switching center (MSC) associated with the first end user registering in a particular service area; and
    (b) a presence server message processor operably associated with the advanced database communications module for forwarding the SIP-formatted presence registration message to a presence server for determining the presence information, wherein the presence server stores the presence information for the first end user, and subscription information indicating a second end user subscribed to automatically receive presence information regarding the first end user and sends a response to the SIP-formatted presence registration message to the second end user, thereby informing the second end user of the appropriate communications medium for contacting the first end user using text messaging protocol communications and whether the first end user is currently available to receive text messaging protocol messages via the communications medium.

2. The presence registration and routing node of claim 1 wherein the presence server message processor is adapted to receive the presence information from the presence server and forward the presence information to the advanced database communications module.

3. The presence registration and routing node of claim 2 wherein the advanced database communications module is adapted to forward the presence information to an endpoint over an IP network.

4. The presence registration and routing node of claim 1 comprising a presence server operatively associated with the presence server message processor for providing the presence information to the presence server message processor.

5. The presence registration and routing node of claim 4 wherein the presence server is located internal to the presence registration and routing node.

6. The presence registration and routing node of claim 4 wherein the presence server is located external to the presence registration and routing node.

7. The presence registration and routing node of claim 1 comprising:
    (a) means for generating an accounting message based on the SIP-formatted presence registration message; and
    (b) an accounting and billing system for storing accounting information based on the accounting message.

8. The presence registration and routing node of claim 1 wherein the advanced database communications module is adapted to transfer IP-encapsulated SS7 signaling messages between IP signaling links.

9. The presence registration and routing node of claim 1 wherein the text messaging protocol comprises presence information that includes information usable by the users subscribed to the target end user for contacting the target end user via an instant message messaging protocol.

* * * * *